(12) United States Patent
Lai

(10) Patent No.: US 12,537,431 B2
(45) Date of Patent: Jan. 27, 2026

(54) HIGH PRECISION INDUCTOR CURRENT EMULATOR CIRCUIT AND EMULATION CONTROL CIRCUIT AND CONTROL METHOD THEREOF

(71) Applicant: Richtek Technology Corporation, Zhubei (TW)

(72) Inventor: Fu-Shiang Lai, Taichung (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 300 days.

(21) Appl. No.: 18/505,165

(22) Filed: Nov. 9, 2023

(65) Prior Publication Data

US 2024/0186895 A1 Jun. 6, 2024

(30) Foreign Application Priority Data

Dec. 6, 2022 (TW) .................................. 111146840

(51) Int. Cl.
*H02M 1/00* (2006.01)
*H02M 3/158* (2006.01)
*H02M 1/088* (2006.01)

(52) U.S. Cl.
CPC ....... *H02M 1/0009* (2021.05); *H02M 3/1588* (2013.01); *H02M 1/088* (2013.01)

(58) Field of Classification Search
CPC .... H02M 1/0009; H02M 1/088; H02M 3/156; H02M 3/158; H02M 3/1588
See application file for complete search history.

(56) References Cited

U.S. PATENT DOCUMENTS

| 6,278,263 B1 | 8/2001 | Walters et al. |
| 6,414,470 B1 | 7/2002 | Liu et al. |
| 7,045,993 B1* | 5/2006 | Tomiyoshi .......... H02M 3/1588 323/224 |
| 8,358,113 B2 | 1/2013 | Cheng et al. |
| 8,405,368 B2 | 3/2013 | Laur et al. |
| 10,200,050 B1 | 2/2019 | Ren |
| 11,799,473 B1* | 10/2023 | Hsu .......................... H03K 5/24 |
| 2015/0222171 A1* | 8/2015 | Nguyen .................. H02M 1/08 323/282 |
| 2021/0099080 A1* | 4/2021 | Chen ..................... H02M 3/155 |

(Continued)

FOREIGN PATENT DOCUMENTS

EP 2457317 B1 9/2018

*Primary Examiner* — Gary L Laxton
(74) *Attorney, Agent, or Firm* — Tung & Associates

(57) ABSTRACT

An inductor current emulator circuit is for use in a switching power regulator, wherein a first and a second switches of a power stage circuit switch an inductor. The first and second switches are ON during first and a second ON-times, respectively. The inductor current emulator circuit includes: a sensing circuit sensing an ON-current of the second switch to generate a current sensing signal; and an emulation control circuit configured to, when a duty ratio of the first switch is smaller than a first duty ratio threshold, generate a first part of a current emulation signal according to the current sensing signal during the second ON-time, and sample-and-hold the current sensing signal to generate a first sample-and-hold signal at an intermediate time point of the second ON-time, and generate a second part of the current emulation signal according to the first sample-and-hold signal at a following first ON-time.

30 Claims, 22 Drawing Sheets

(56) References Cited

U.S. PATENT DOCUMENTS

2022/0045605 A1   2/2022  Wu et al.
2022/0131468 A1   4/2022  Yoo et al.
2023/0400490 A1*  12/2023 Chen ..................... H02M 1/08
2024/0030811 A1*  1/2024  D'Souza ............ H02M 1/0009

* cited by examiner

HIGH PRECISION INDUCTOR CURRENT EMULATOR CIRCUIT AND EMULATION CONTROL CIRCUIT AND CONTROL METHOD THEREOF

CROSS REFERENCE

The present invention claims priority to TW 111146840 filed on Dec. 6, 2022.

BACKGROUND OF THE INVENTION

Field of Invention

The present invention relates to an inductor current emulator circuit; particularly, it relates to such inductor current emulator circuit capable of precisely emulate an inductor current. The present invention also relates to an emulation control circuit an emulation control method configured to operably control an inductor current emulator circuit.

Description of Related Art

The following prior arts are relevant to the present invention: U.S. Pat. No. 8,358,113B2, U.S. Pat. No. 6,278,263B1, U.S. Pat. No. 6,414,470B1, U.S. Pat. No. 8,405,368B2 and U.S. patent Ser. No. 10/200,050B1.

Please refer to FIG. 1A, which shows a schematic block diagram of a conventional current signal generation circuit. As shown in FIG. 1A, a power stage circuit 101 in a switching power regulator includes: an upper gate switch QH, a lower gate switch QL and an inductor L. The power stage circuit 101 converts an input voltage VI to an output voltage VO. A control circuit 102 generates an upper gate control signal UG and a lower gate control signal LG, wherein the upper gate control signal UG and the lower gate control signal LG serve to control the upper gate switch QH and the lower gate switch QL, respectively. A current signal generation circuit 1000 of this prior art serves to sense an inductor current IL flowing through the inductor L, to generate a current sensing signal Vcss. The current signal generation circuit 1000 comprises: a sensing circuit 103 and a sensing circuit 104, wherein the sensing circuit 103 and the sensing circuit 104 serve to respectively sense an upper gate switch current IQH of the upper gate switch QH and a lower gate switch current IQL of the lower gate switch QL, so as to respectively generate a sensing signal SH and a sensing signal SL. The aforementioned current sensing signal Vcss is a sum of the sensing signal SH plus the sensing signal SL; the current sensing signal Vcss is correlated with the inductor current IL.

Please refer to FIG. 1B, which illustrates a signal waveform diagram depicting the operation of the conventional current signal generation circuit of FIG. 1A. As shown in FIG. 1B, the switching period of the upper gate switch QH and the lower gate switch QL is denoted as period T1. The upper gate switch QH is controlled by the upper gate control signal UG, wherein a current flowing through the upper gate switch QH is the upper gate switch current IQH. This prior art is a buck switching power regulator; when this prior art operates in a continuous conduction mode (CCM), on one hand, the sensing signal SH generated by the sensing circuit 103 sensing the upper gate switch current IQH has a gradually increasing high level during an ON-time to1; on the other hand, the lower gate switch QL is controlled by the lower gate control signal LG, wherein a current flowing through the lower gate switch QL is the lower gate switch current IQL. The sensing signal SL generated by the sensing circuit 104 sensing the lower gate switch current IQL has a gradually decreasing high level during an ON-time to2.

The prior art shown in FIG. 1A and FIG. 1B has the following drawback. When a duty ratio of the upper gate switch QH or a duty ratio of the lower gate switch QL is very low, the current sensing signal Voss generated by the current signal generation circuit 1000 will deviate from an ideal state. As shown in FIG. 1B, because the duty ratio (i.e., to2/T1) of the lower gate switch QL is very low (due to for example an insufficient bandwidth of the sensing circuit 104), the falling speed of the current sensing signal Voss during the ON-time to2 is slower than the ideal current sensing signal Vcss' (referring to FIG. 1B, the current sensing signal Vcss deviates from the ideal state illustrated by the dotted line), that is, the current sensing signal Vcss is imprecise. Besides, in an application wherein the prior art is applied in a multi-phase power converter, the aforementioned drawback will be more severe to cause worse inaccuracy in current sensing of the multi-phase power converter.

In view of the above, to overcome the drawback in the prior art, the present invention proposes a high precision inductor current emulator circuit. Regardless of a low duty ratio of the upper gate switch QH or a low duty ratio of the lower gate switch QL, the present invention can emulate the inductor current more precisely; besides, in an application of multi-phase power converter having an very high frequency, either when the present invention operates in a low cycle period or operates in a high cycle period, the present invention can ensure currents flowing through respective channels to reach a balanced state via a precise current emulation signal, and by means of the precise current information, the present invention can adaptively adjust the operating channel number to optimum.

SUMMARY OF THE INVENTION

From one perspective, the present invention provides an inductor current emulator circuit for use in a switching power regulator, wherein the switching power regulator is configured to operably control a first switch and a second switch of a power stage circuit in the switching power regulator, to switch an inductor, thus converting an input voltage to an output voltage, wherein the inductor current emulator circuit is configured to operably generate a current emulation signal for emulating an inductor current flowing through the inductor, wherein the first switch is controlled by a first switch control signal and the first switch has a first ON-current when the first switch is ON during a first ON-time, and wherein the second switch is controlled by a second switch control signal and the second switch has a second ON-current when the second switch is ON during a second ON-time; the inductor current emulator circuit comprising: a first sensing circuit, which is configured to operably sense the second ON-current of the second switch, to generate a first current sensing signal; and an emulation control circuit, which is configured to operably generate a first part of the current emulation signal according to the first current sensing signal during the second ON-time in a case when a first duty ratio of the first switch is smaller than a first duty ratio threshold, and the emulation control circuit is configured to operably sample-and-hold the first current sensing signal to generate a first sample-and-hold signal at an intermediate time point within the second ON-time, and the emulation control circuit is configured to operably generate a second part of the current emulation signal according to the first sample-and-hold signal during a following first ON-time.

In one embodiment, the inductor current emulator circuit further comprises: a second sensing circuit, which is configured to operably sense the first ON-current of the first switch, to generate a second current sensing signal; wherein the emulation control circuit is further configured to operably generate the second part of the current emulation signal according to the second current sensing signal during the first ON-time in a case when the first duty ratio of the first switch is greater than a second duty ratio threshold, and the emulation control circuit is further configured to operably sample-and-hold the second current sensing signal to generate a second sample-and-hold signal at an intermediate time point within the first ON-time, and the emulation control circuit is further configured to operably generate the first part of the current emulation signal according to the second sample-and-hold signal during a following second ON-time.

In one embodiment, the first switch and the second switch are configured as one of following: the first switch is configured as an upper gate switch of the power stage circuit, whereas, the second switch is configured as a lower gate switch of the power stage circuit; or, the first switch is configured as a lower gate switch of the power stage circuit, whereas, the second switch is configured as an upper gate switch of the power stage circuit.

In one embodiment, the second duty ratio threshold is greater than or equal to the first duty ratio threshold.

In one embodiment, the first duty ratio threshold is equal to 50%.

In one embodiment, when the first duty ratio is greater than the first duty ratio threshold and smaller than the second duty ratio threshold, the emulation control circuit is configured to operably generate the second part of the current emulation signal according to the second current sensing signal during the first ON-time, and the emulation control circuit is configured to operably generate the first part of the current emulation signal according to the first current sensing signal during the second ON-time.

In one embodiment, the switching power regulator includes: a plurality of the power stage circuits and a corresponding plurality of the inductor current emulator circuits, wherein a current balancing operation and a phase shedding operation of the power stage circuits are determined according to a corresponding plurality of the current emulation signals generated by the inductor current emulator circuits.

In one embodiment, the inductor current emulator circuit further comprises: a second sensing circuit, which is configured to operably sense the first ON-current of the first switch, to generate a second current sensing signal; wherein in a case when the first duty ratio is greater than the first duty ratio threshold, the emulation control circuit is configured to operably generate the second part of the current emulation signal according to the second current sensing signal during the first ON-time, and the emulation control circuit is configured to operably generate the first part of the current emulation signal according to the first current sensing signal during a following second ON-time.

In one embodiment, the emulation control circuit includes: a first intermediate time point generation circuit, which is configured to operably indicate the intermediate time point within the second ON-time; wherein the first intermediate time point generation circuit includes: a first integrator, which is configured to operably execute an integration operation on a first current source according to a first clock signal and the second switch control signal during an enable period of the first clock signal, to generate a first timing ramp signal, wherein a level of the first timing ramp signal at an end time point of the enable period of the first clock signal is proportional to a time length of the enable period of the first clock signal, wherein the enable period of the first clock signal corresponds to at least one second ON-time; a first voltage buffer and conversion circuit, which is configured to operably buffer and convert the first timing ramp signal, to generate a first divided-voltage signal, wherein the first divided-voltage signal has a first voltage division ratio to the first timing ramp signal; a first timing sample-and-hold circuit, which is configured to operably sample-and-hold a level of the first divided-voltage signal at the end time point of the enable period of the first clock signal, to generate a first timing sample-and-hold signal; a second integrator, which is configured to operably execute an integration operation on a second current source according to a second clock signal and the second switch control signal during an enable period of the second clock signal, to generate a second timing ramp signal, wherein the enable period of the second clock signal corresponds to the at least one second ON-time, and the enable period of the second clock signal is subsequent to the enable period of the first clock signal; and a first comparison circuit, which is configured to operably generate a first sample-and-hold control signal according to the first timing sample-and-hold signal and the second timing ramp signal, wherein a time point at which the first timing sample-and-hold signal is equal to the second timing ramp signal corresponds to the intermediate time point within the second ON-time; wherein the first voltage division ratio, a level of the first current source and a level of the second current source decide a time length that the second timing ramp signal takes to reach the first timing sample-and-hold signal.

In one embodiment, the emulation control circuit includes: a second intermediate time point generation circuit, which is configured to operably indicate the intermediate time point within the first ON-time; wherein the second intermediate time point generation circuit includes: a third integrator, which is configured to operably execute an integration operation on a third current source according to a third clock signal and the first switch control signal during an enable period of the third clock signal, to generate a third timing ramp signal, wherein a level of the third timing ramp signal at an end time point of the enable period of the third clock signal is proportional to a time length of the enable period of the third clock signal, wherein the enable period of the third clock signal corresponds to at least one first ON-time; a second voltage buffer and conversion circuit, which is configured to operably buffer and convert the third timing ramp signal, to generate a second divided-voltage signal, wherein the second divided-voltage signal has a second voltage division ratio to the third timing ramp signal; a second timing sample-and-hold circuit, which is configured to operably sample-and-hold a level of the second divided-voltage signal at the end time point of the enable period of the third clock signal, to generate a second timing sample-and-hold signal; a fourth integrator, which is configured to operably execute an integration operation on a fourth current source according to a fourth clock signal and the first switch control signal during an enable period of the fourth clock signal, to generate a fourth timing ramp signal, wherein the enable period of the fourth clock signal corresponds to the at least one first ON-time, and the enable period of the fourth clock signal is subsequent to the enable period of the third clock signal; and a second comparison circuit, which is configured to operably generate a second sample-and-hold control signal according to the second timing sample-and-hold signal and the fourth timing ramp signal, wherein a time point at which the second timing sample-and-hold signal is equal to the fourth timing ramp signal corresponds to the intermediate time point within the first ON-time; wherein the second voltage division ratio, a level of the third current source and a level of the fourth current source decide a time length that the fourth timing ramp signal takes to reach the second timing sample-and-hold signal.

In one embodiment, the emulation control circuit includes: a first duty ratio determination circuit, which is configured to operably generate a first enable signal according to a comparison between a first duty ratio threshold signal and the first switch control signal, wherein the first enable signal indicates whether the first duty ratio is smaller than the first duty ratio threshold, wherein a period of the first duty ratio threshold signal is equal to a switching period of the first switch control signal, and wherein a duty ratio of the first duty ratio threshold signal when the first duty ratio threshold signal is enabled is equal to the first duty ratio threshold.

In one embodiment, the emulation control circuit includes: a second duty ratio determination circuit, which is configured to operably generate a second enable signal according to a comparison between a second duty ratio threshold signal and the second switch control signal, wherein the second enable signal indicates whether the first duty ratio is greater than the second duty ratio threshold, wherein a period of the second duty ratio threshold signal is equal to a switching period of the second switch control signal, and wherein a duty ratio of the second duty ratio threshold signal when the second duty ratio threshold signal is enabled is equal to the second duty ratio threshold.

In one embodiment, the first duty ratio determination circuit includes: a first threshold time point generation circuit, which is configured to operably decide the first duty ratio threshold; wherein the first threshold time point generation circuit includes: a fifth integrator, which is configured to operably execute an integration operation on a fifth current source according to a first period clock signal and the first switch control signal during an enable period of the first period clock signal, to generate a fifth timing ramp signal, wherein a level of the fifth timing ramp signal at an end time point of the enable period of the first period clock signal is proportional to a time length of the enable period of the first period clock signal, wherein the enable period of the first period clock signal corresponds to the switching period of at least one the first switch control signal; a third voltage buffer and conversion circuit, which is configured to operably buffer and convert the fifth timing ramp signal, to generate a third divided-voltage signal, wherein the third divided-voltage signal has a third voltage division ratio to the fifth timing ramp signal; a third timing sample-and-hold circuit, which is configured to operably sample-and-hold a level of the third divided-voltage signal at the end time point of the enable period of the first period clock signal, to generate a third timing sample-and-hold signal; a sixth integrator, which is configured to operably execute an integration operation on a sixth current source according to a second period clock signal and the first switch control signal during an enable period of the second period clock signal, to generate a sixth timing ramp signal, wherein the enable period of the second period clock signal corresponds to the switching period of at least one the first switch control signal and the enable period of the second period clock signal is subsequent to the enable period of the first period clock signal; and a third comparison circuit, which is configured to operably generate a third sample-and-hold control signal according to the third timing sample-and-hold signal and the sixth timing ramp signal, wherein a time point at which the third timing sample-and-hold signal is equal to the sixth timing ramp signal indicates a time point within the switching period which corresponds to the first duty ratio threshold; wherein the third voltage division ratio, a level of the fifth current source and a level of the sixth current source decide a time length that the sixth timing ramp signal takes to reach the third timing sample-and-hold signal.

From another perspective, the present invention provides an emulation control circuit for use in an inductor current emulator circuit, wherein the inductor current emulator circuit is for use in a switching power regulator, wherein the switching power regulator is configured to operably control a first switch and a second switch of a power stage circuit in the switching power regulator, to switch an inductor, thus converting an input voltage to an output voltage, wherein the inductor current emulator circuit is configured to operably generate a current emulation signal for emulating an inductor current flowing through the inductor, wherein the first switch is controlled by a first switch control signal and the first switch has a first ON-current when the first switch is ON during a first ON-time, and wherein the second switch is controlled by a second switch control signal and the second switch has a second ON-current when the second switch is ON during a second ON-time, wherein the inductor current emulator circuit includes: a first sensing circuit, which is configured to operably sense the second ON-current of the second switch, to generate a first current sensing signal; wherein the emulation control circuit is configured to operably generate a first part of the current emulation signal according to the first current sensing signal during the second ON-time in a case when a first duty ratio of the first switch is smaller than a first duty ratio threshold, and the emulation control circuit is configured to operably sample-and-hold the first current sensing signal to generate a first sample-and-hold signal at an intermediate time point within the second ON-time, and the emulation control circuit is configured to operably generate a second part of the current emulation signal according to the first sample-and-hold signal during a following first ON-time.

From yet another perspective, the present invention provides an emulation control method configured to operably control an inductor current emulator circuit, wherein the inductor current emulator circuit is for use in a switching power regulator, wherein the switching power regulator is configured to operably control a first switch and a second switch of a power stage circuit in the switching power regulator, to switch an inductor, thus converting an input voltage to an output voltage, wherein the inductor current emulator circuit is configured to operably generate a current emulation signal for emulating an inductor current flowing through the inductor, wherein the first switch is controlled by a first switch control signal and the first switch has a first ON-current when the first switch is ON during a first ON-time, wherein second switch is controlled by a second switch control signal and the second switch has a second ON-current when the second switch is ON during a second ON-time, wherein the inductor current emulator circuit includes: a first sensing circuit, which is configured to operably sense the second ON-current of the second switch, to generate a first current sensing signal; the emulation control method comprising following steps: generating a first part of the current emulation signal according to the first current sensing signal during the second ON-time in a case when a first duty ratio of the first switch is smaller than a first duty ratio threshold; and sampling-and-holding the first current sensing signal to generate a first sample-and-hold signal at an intermediate time point within the second ON-time; and emulation signal generating a second part of the current according to the first sample-and-hold signal during a following first ON-time.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies. For better understanding the essence of the present invention, practical implementation details will be described in the embodiments below. It should be understood that such details are not for limiting the broadest scope of the present invention Please refer to FIG. 2A and FIG. 2B, which show two embodiments of an inductor current emulator circuit according to the present invention, respectively. In one embodiment, the inductor current emulator circuit 3000 of the present invention is for use in a switching power regulator 1002A. The switching power regulator 1002A is configured to operably control a first switch and a second switch of a power stage circuit 200 in the switching power regulator 1002A, to switch an inductor L1, thus converting an input voltage Vin to an output voltage Vout. In one embodiment, the first switch and the second switch are metal-oxide-semiconductor (MOS) field-effect transistors.

Figure 1A:
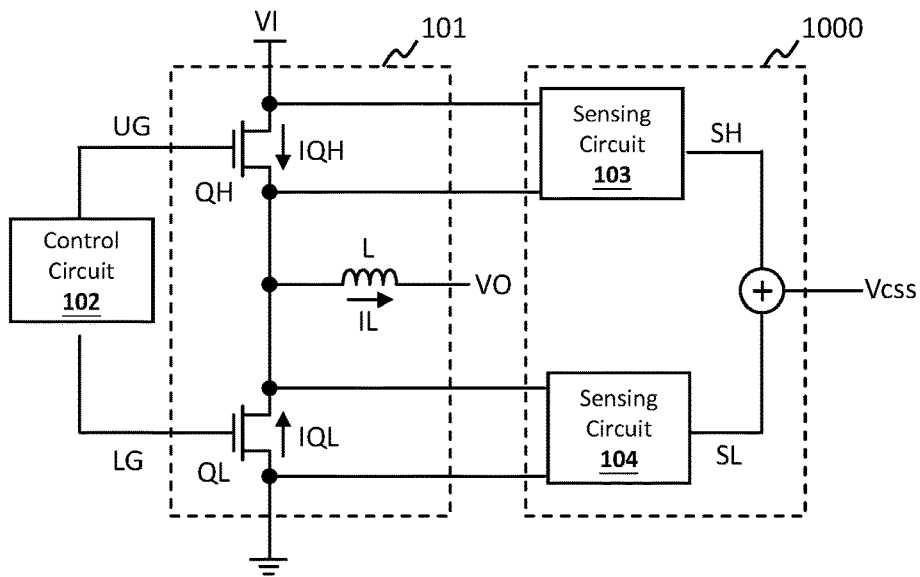
FIG. 1A shows a schematic block diagram of a conventional current signal generation circuit.
Figure 1B:
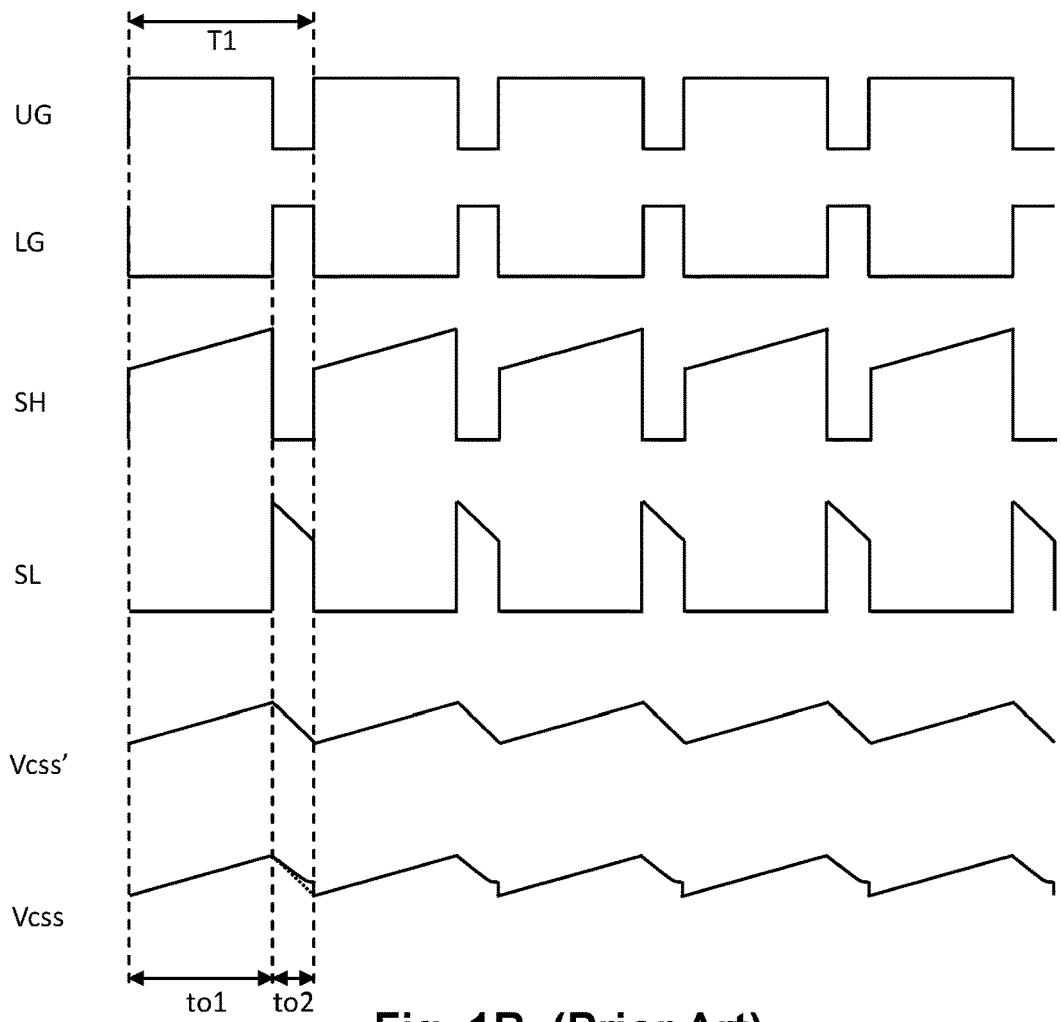
FIG. 1B illustrates a signal waveform diagram depicting the operation of the conventional current signal generation circuit of FIG. 1A.
Figure 2A:
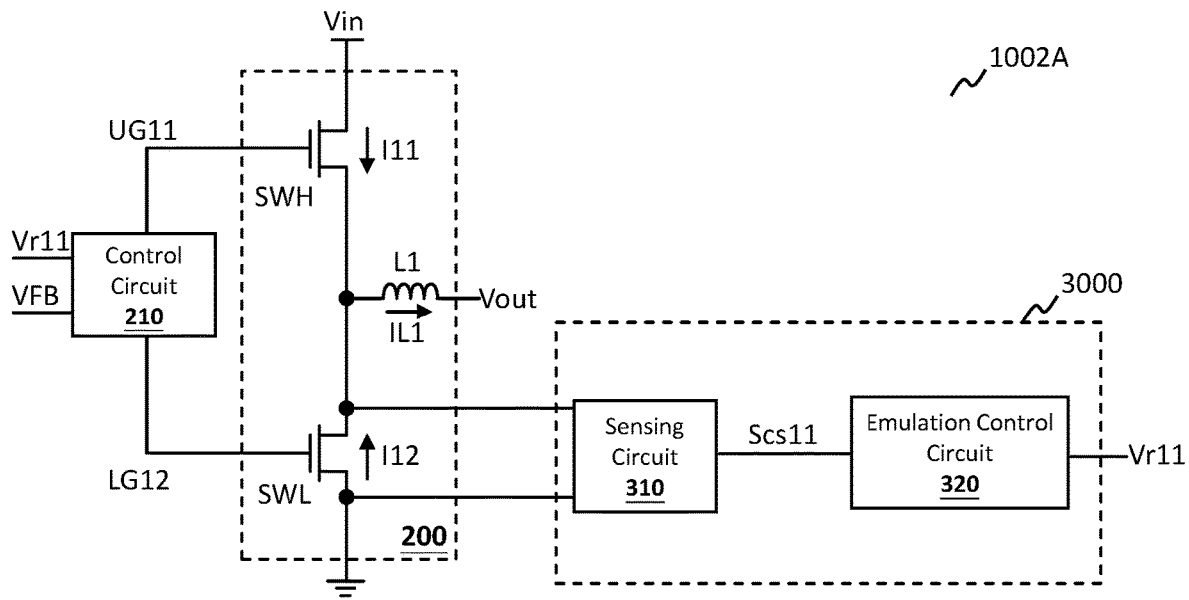
FIG. 2A and FIG. 2B show two schematic block diagrams of an inductor current emulator circuit according to two embodiments of the present invention, respectively.

Please refer to FIG. 2A. In one embodiment, a control circuit 210 is configured to operably generate a switch control signal UG11 and a switch control signal LG12 according to a feedback signal VFB and a current emulation signal Vr11, wherein the feedback signal VFB is correlated with the output voltage Vout. In one embodiment, the feedback signal VFB is for example a divided voltage of the output voltage Vout. In one embodiment, the first switch is an upper gate switch SWH of the power stage circuit 200, whereas, the second switch is a lower gate switch SWL of the power stage circuit 200. In this embodiment, the inductor current emulator circuit 3000 is configured to operably generate the current emulation signal Vr11 for emulating an inductor current IL1 flowing through an inductor L1.

Figure 3A:
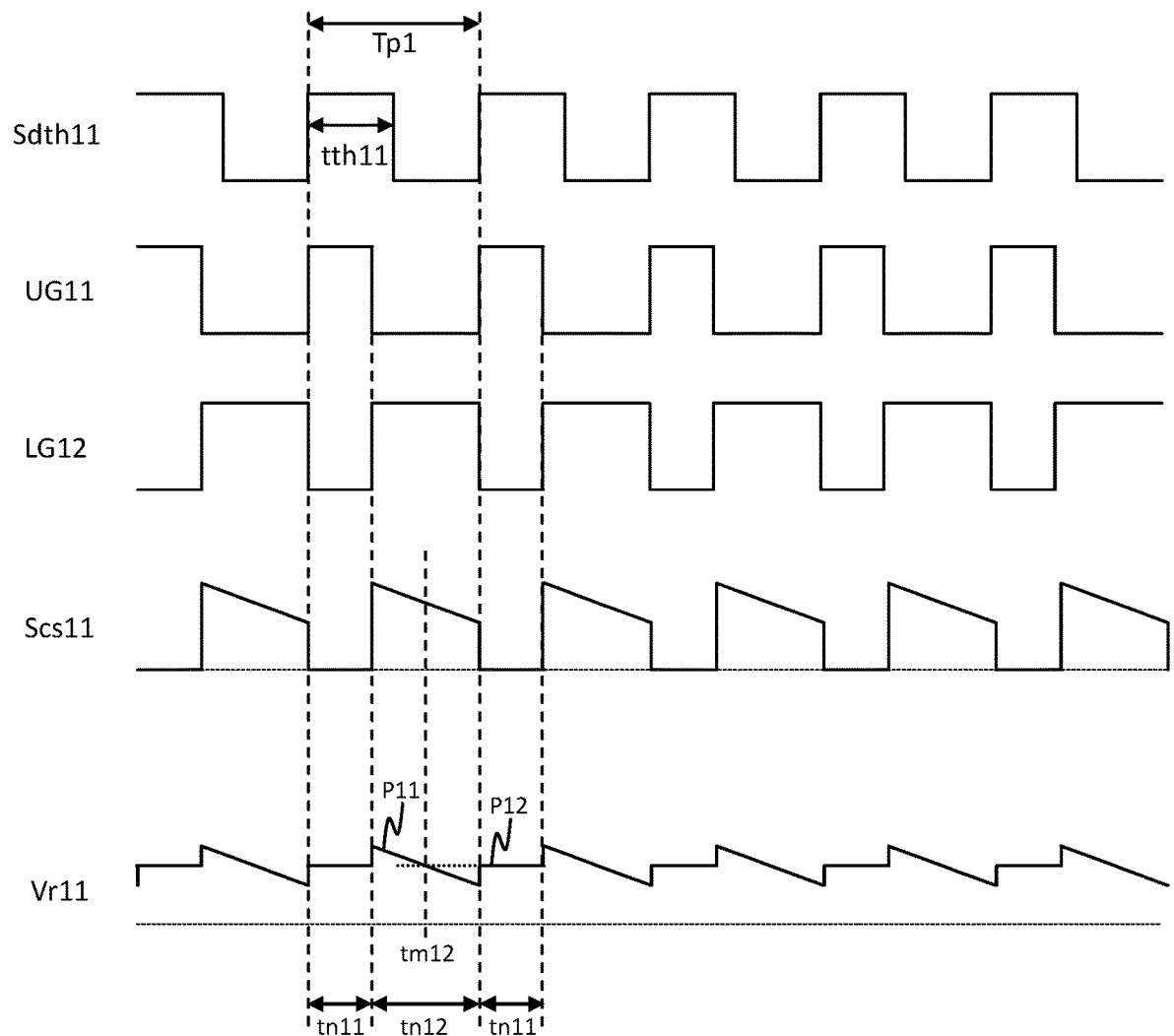
FIG. 3A illustrates a signal waveform diagram depicting the operation of the inductor current emulator circuit of FIG. 2A.

Please refer to FIG. 2A in conjunction with FIG. 3A. FIG. 3A illustrates a signal waveform diagram depicting the operation of the inductor current emulator circuit of FIG. 2A. In the aforementioned embodiment, an ON-state of the first switch (i.e., upper gate switch SWH) is controlled by a switch control signal UG11 and the first switch has a ON-current I11 when the first switch is ON during an ON-time tn11 (i.e., the ON-time of the switch control signal UG11). In this embodiment, an ON-state of the second switch (i.e., lower gate switch SWL) is controlled by a switch control signal LG12 and the second switch has an ON-current I12 when the second switch is ON during an ON-time tn12 (i.e., the ON-time of the switch control signal LG12). In this embodiment, the switching period of the first switch and the second switch is denoted as period Tp1. It is worthwhile noting that, the aforementioned term "ON-current", as may be used herein, refers to a current flowing through a switch when the switch is ON during an ON-time.

Please still refer to FIG. 2A and FIG. 3A. In one embodiment, the inductor current emulator circuit 3000 comprises:

a sensing circuit 310 and an emulation control circuit 320. In this embodiment, the sensing circuit 310 is coupled to the lower gate switch SWL and the sensing circuit 310 is configured to operably sense the ON-current I12 of the lower gate switch SWL, to generate a current sensing signal Scs11. In this embodiment, the emulation control circuit 320 is configured to operably generate a first part P11 of the current emulation signal Vr11 according to the current sensing signal Scs11 during the ON-time tn12 in a case when a duty ratio DH (i.e., tn11/Tp1) of the upper gate switch SWH is smaller than a duty ratio threshold Dth11, and the emulation control circuit 320 is configured to operably sample-and-hold the current sensing signal Scs11 to generate a sample-and-hold signal at an intermediate time point tm12 within the ON-time tn12; further, the emulation control circuit 320 is configured to operably generate a second part P12 of the current emulation signal Vr11 according to the sample-and-hold signal during a following ON-time tn11. The details of the sample-and-hold signal will be explained later with reference to following embodiments. The aforementioned duty ratio threshold Dth11 is equal to tth11/Tp1; as shown in FIG. 3A, tth11 denotes an enable period of a duty ratio threshold signal Sdth11.

Figure 2B:
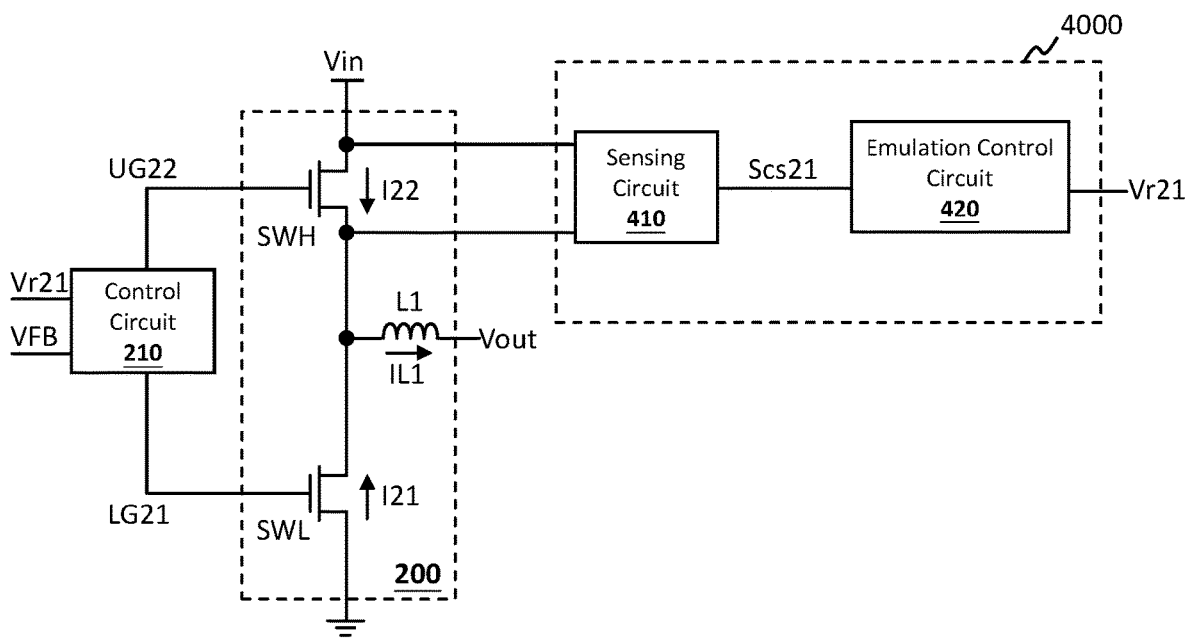

Please refer to FIG. 2B. In one embodiment, the control circuit 210 is configured to operably generate a switch control signal UG22 and a switch control signal LG21. In one embodiment, the first switch is the lower gate switch SWL of the power stage circuit 200, whereas, the second switch is the upper gate switch SWH of the power stage circuit 200. In this embodiment, the inductor current emulator circuit 4000 is configured to operably generate the current emulation signal Vr21 for emulating an inductor current IL1 flowing through the inductor L1.

Figure 3B:
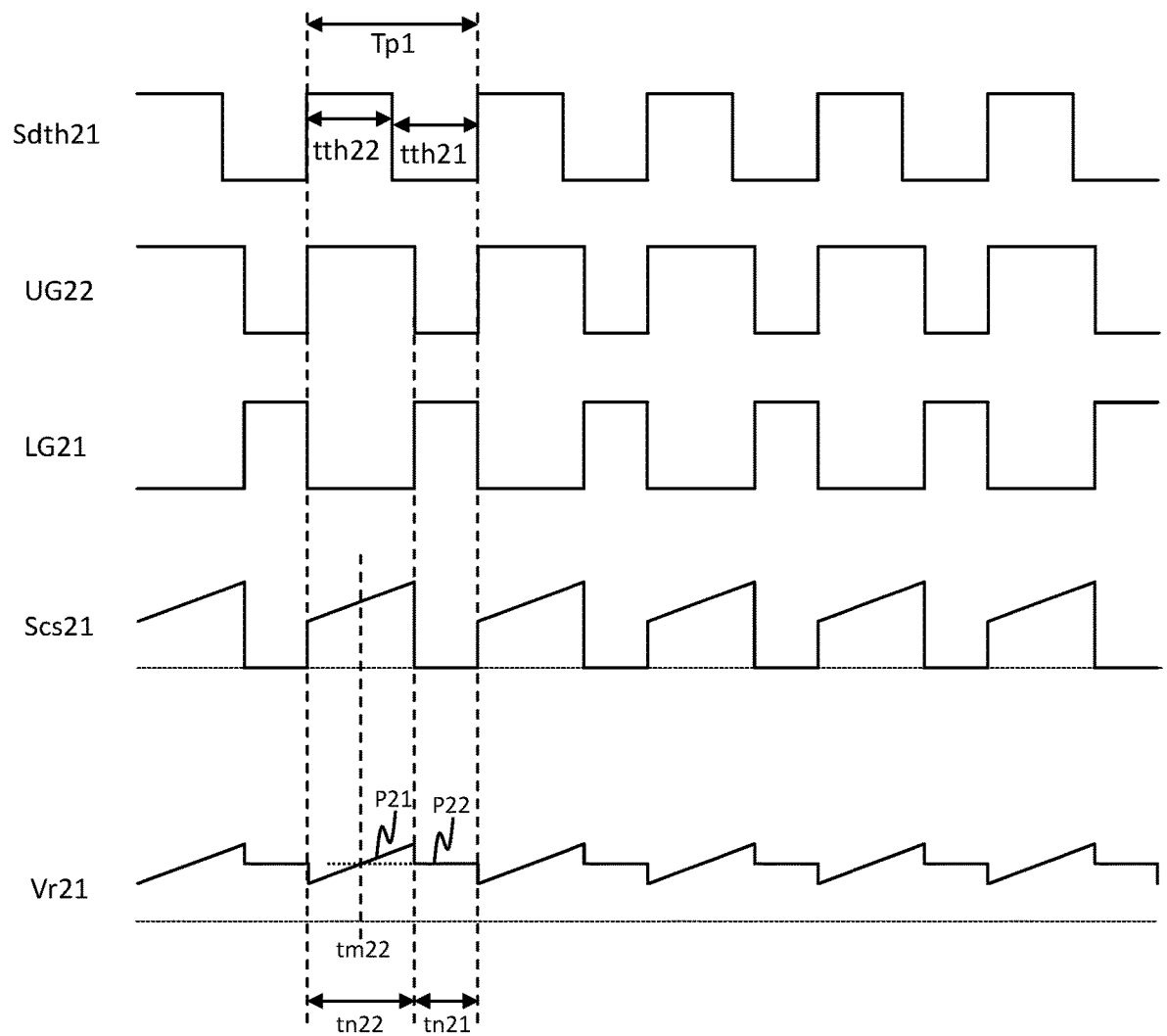
FIG. 3B illustrates a signal waveform diagram depicting the operation of the inductor current emulator circuit of FIG. 2B.

Please refer to FIG. 2B in conjunction with FIG. 3B. FIG. 3B illustrates a signal waveform diagram depicting the operation of the inductor current emulator circuit of FIG. 2B. In this embodiment, an ON-state of the first switch (i.e., lower gate switch SWL) is controlled by a switch control signal LG21 and the first switch has an ON-current I21 when the first switch is ON during an ON-time tn21 (i.e., the ON-time of the switch control signal LG21). In this embodiment, an ON-state of the second switch (i.e., upper gate switch SWH) is controlled by a switch control signal UG22 and the second switch has an ON-current I22 when the second switch is ON during an ON-time tn22 (i.e., the ON-time of the switch control signal UG22). In this embodiment, the switching period of the first switch and the second switch is denoted as period Tp1.

Please still refer to FIG. 2B and FIG. 3B. In one embodiment, the inductor current emulator circuit 4000 comprises: a sensing circuit 410 and an emulation control circuit 420. In this embodiment, the sensing circuit 410 is coupled to the upper gate switch SWH and the sensing circuit 410 is configured to operably sense the ON-current I22 of the upper gate switch SWH, to generate a current sensing signal Scs21. In this embodiment, the emulation control circuit 420 is configured to operably generate a first part P21 of the current emulation signal Vr21 according to the current sensing signal Scs21 during the ON-time tn22 in a case when a duty ratio DL (i.e., tn21/Tp1) of the lower gate switch SWL is smaller than a duty ratio threshold Dth21, and the emulation control circuit 420 is configured to operably sample-and-hold the current sensing signal Scs21 to generate a sample-and-hold signal at an intermediate time point tm22 within the ON-time tn22; further, the emulation control circuit 420 is configured to operably generate a second part P22 of the current emulation signal Vr21 according to the sample-and-hold signal during a following ON-time tn21. Details of the sample-and-hold signal will be explained later with reference to following embodiments. The aforementioned duty ratio threshold Dth21 is equal to tth21/Tp1, as shown in FIG. 3B, wherein tth21 denotes an enable period of the duty ratio threshold signal Sdth21.

It is worthwhile noting that, in the embodiment shown in FIG. 2B, the duty ratio DH (i.e., tn22/Tp1) of the upper gate switch SWH is greater than the duty ratio threshold Dth22 (i.e., tth22/Tp1).

FIGS. 2A and 2B respectively demonstrate configurations of a first case wherein the first switch is configured as an upper gate switch SWH and the second switch is configured as a lower gate switch SWL, and a second case wherein the first switch is configured as a lower gate switch SWL and the second switch is configured as an upper gate switch SWH. For the sake of convenience in explanation, the following embodiments will use the first case (wherein the first switch is configured as an upper gate switch SWH and the second switch is configured as a lower gate switch SWL) as an example; those skilled in this art can readily understand how the second case operates by analogy.

Figure 4A:
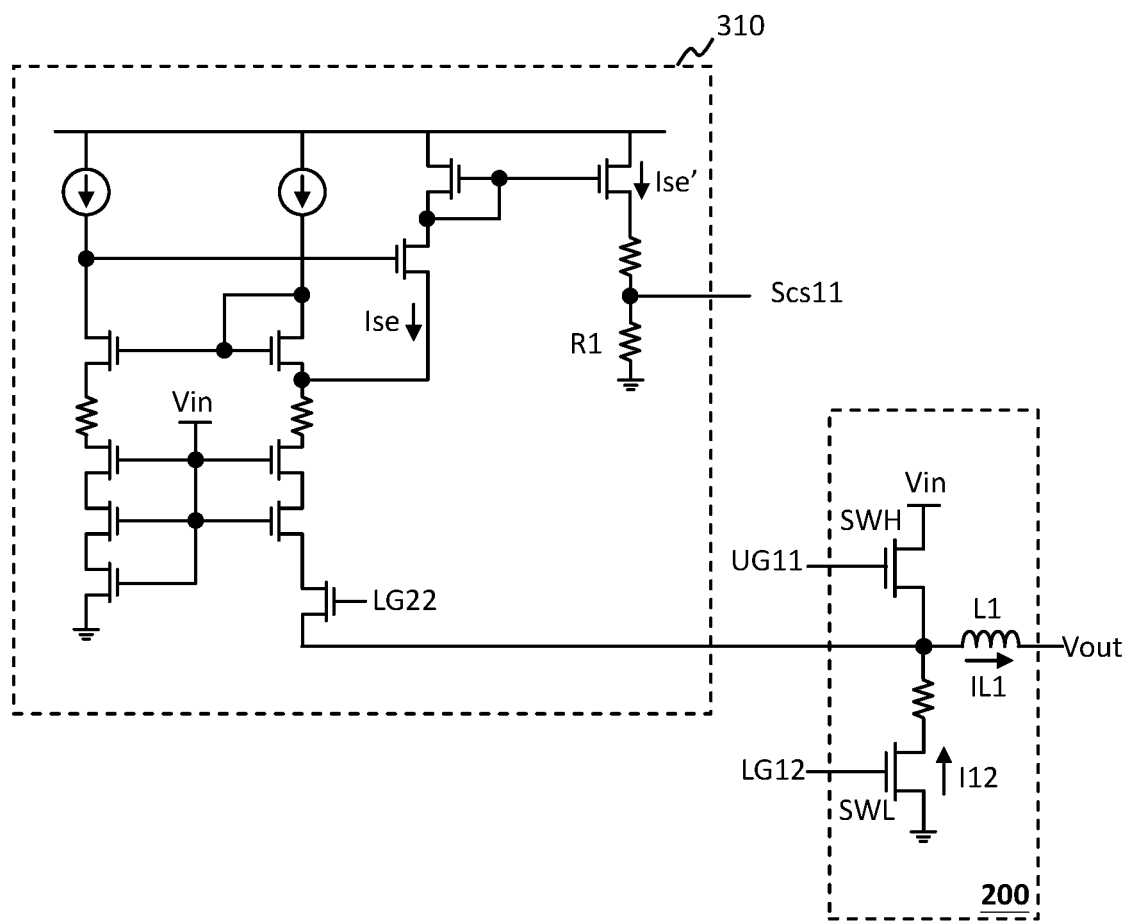
FIG. 4A shows a schematic diagram of a sensing circuit in an inductor current emulator circuit according to an embodiment of the present invention.

Please refer to FIG. 4A, which shows a schematic diagram of a sensing circuit in an inductor current emulator circuit according to an embodiment of the present invention. The sensing circuit 310 shown in FIG. 4A is a specific embodiment of the sensing circuit 310 shown in FIG. 2A. A sensing current Ise generated by the sensing circuit 310 is proportional to the ON-current I12 of the lower gate switch SWL, wherein the sensing current Ise can generate a current sensing signal Scs11 via a mirrored current Ise' and a resistor R1.

Figure 4B:
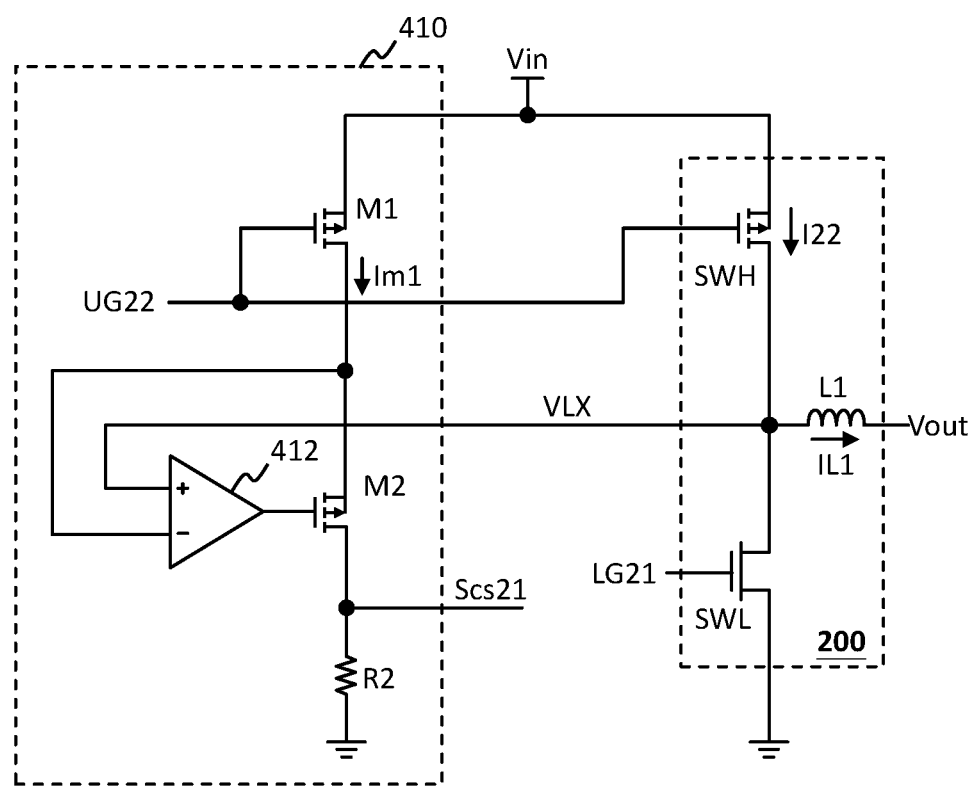
FIG. 4B shows a schematic diagram of a sensing circuit in an inductor current emulator circuit according to another embodiment of the present invention.

Please refer to FIG. 4B, which shows a schematic diagram of a sensing circuit in an inductor current emulator circuit according to another embodiment of the present invention. The sensing circuit 410 shown in FIG. 4B is a specific embodiment of the sensing circuit 410 shown in FIG. 2B. In one embodiment, A transistor M1 mirrors the ON-current I22 of the upper gate switch SWH, to generate a mirror current Im1, thus generating a current sensing signal Scs21 via a resistor R2. A drain voltage of the transistor M1 is regulated to be equal to a switching node voltage VLX by a feedback amplifier 412 and a transistor M2 through feedback control mechanism, whereby the ON-current I22 of the upper gate switch SWH is precisely mirrored to generate the mirror current Im1 with a preset ratio.

Figure 5:
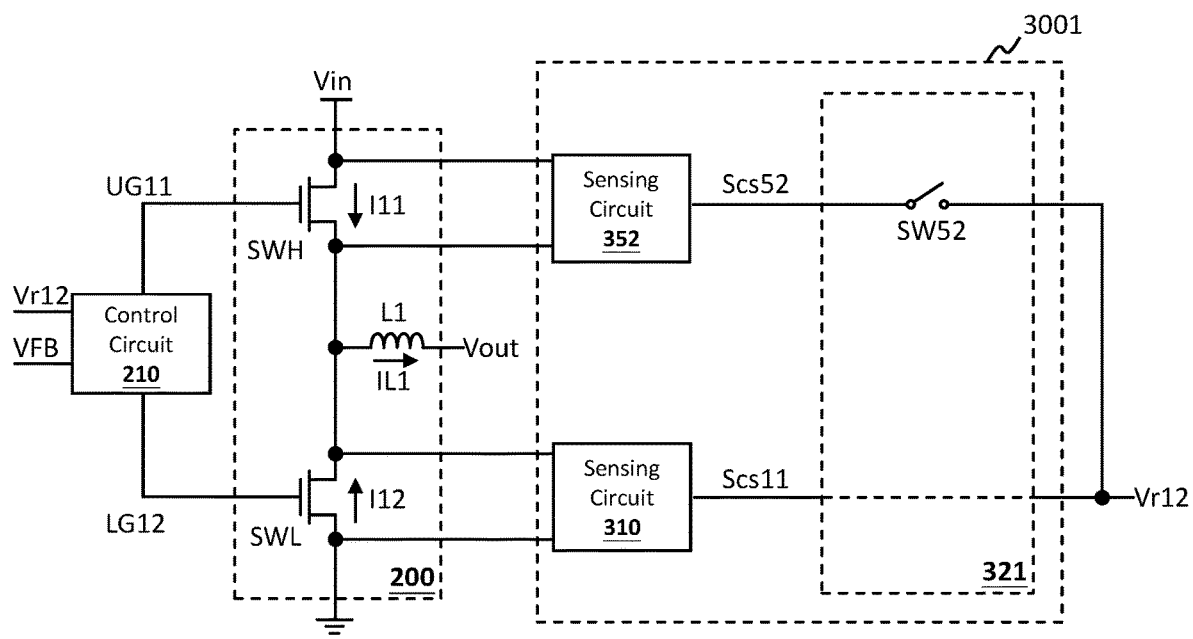
FIG. 5 shows a schematic block diagram of an inductor current emulator circuit according to an embodiment of the present invention.

Please refer to FIG. 5, which shows a schematic block diagram of an inductor current emulator circuit according to an embodiment of the present invention. The inductor current emulator circuit 3001 of this embodiment shown in FIG. 5 is similar to the inductor current emulator circuit 3000 of the embodiment shown in FIG. 2A, but is different in that: the inductor current emulator circuit 3001 of this embodiment shown in FIG. 5 further comprises a sensing circuit 352. An emulation control circuit 321 of this embodiment includes a switch SW52. In one embodiment, the switch SW52 is coupled to the sensing circuit 352. The sensing circuit 352 is coupled to the upper gate switch SWH and the sensing circuit 352 is configured to operably sense an ON-current I11 of the upper gate switch SWH, to generate a current sensing signal Scs52.

Figure 6:
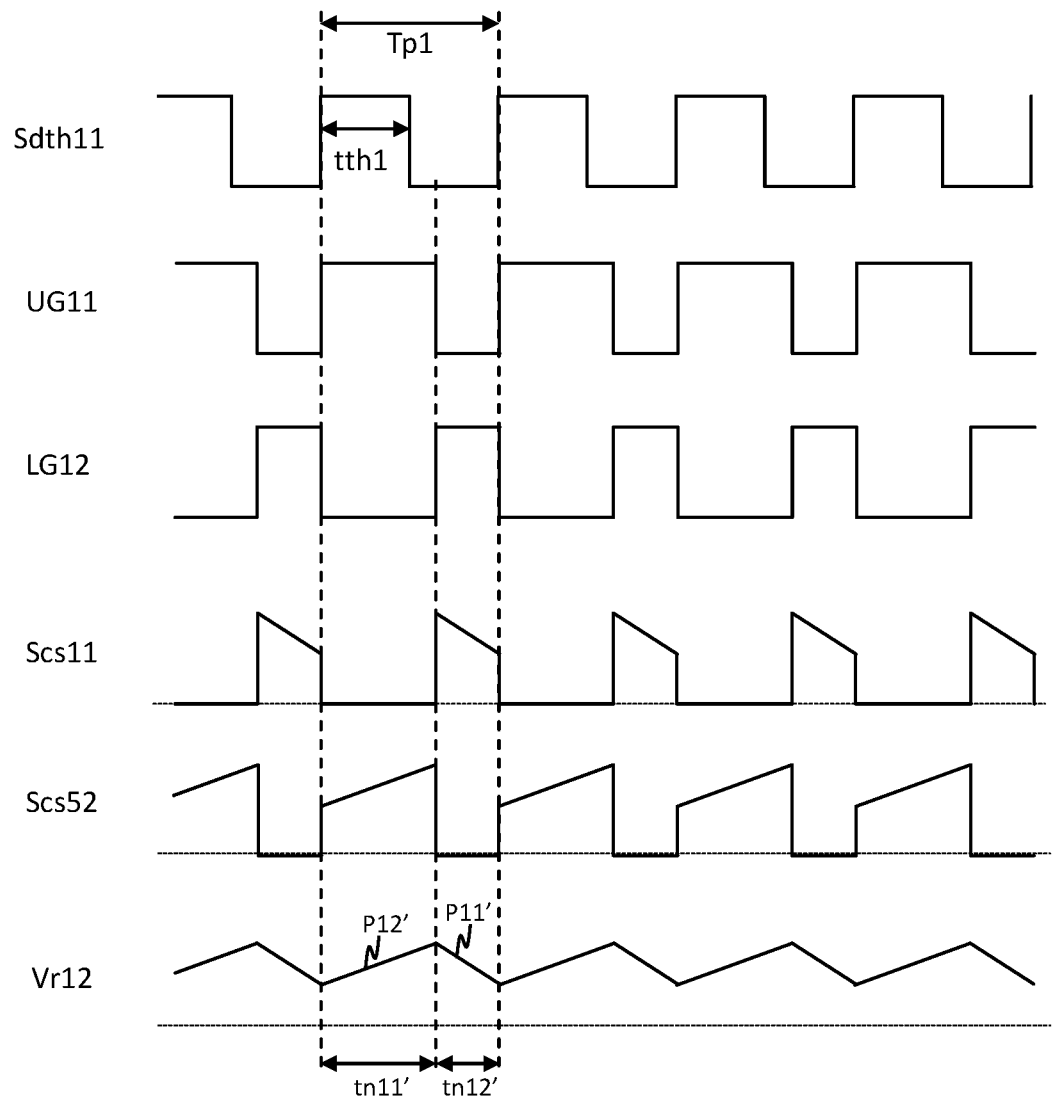
FIG. 6 illustrates a signal waveform diagram depicting the operation of the inductor current emulator circuit of FIG. 5.

Please refer to FIG. 5 along with FIG. 6. FIG. 6 illustrates a signal waveform diagram depicting the operation of the inductor current emulator circuit of FIG. 5. In one embodiment, the upper gate switch SWH has an ON-current I11 when the upper gate switch SWH is ON during an ON-time tn11', whereas, the lower gate switch SWL has an ON-current I12 when the lower gate switch SWL is ON during an ON-time tn12'. In one embodiment, as shown in FIG. 6, in a case when the duty ratio DH (i.e., tn11'/Tp1) of the upper gate switch SWH is greater than a duty ratio threshold Dth11 (i.e., tth11/Tp1), the emulation control circuit 321 controls the switch SW52 to be ON during the ON-time tn11', so as to generate a second part P12' of the current emulation signal Vr12 according to the current sensing signal Scs52, and the emulation control circuit 321 generates a first part P11' of the current emulation signal Vr12 according to the current sensing signal Scs11 during a following ON-time tn12'.

Figure 7:
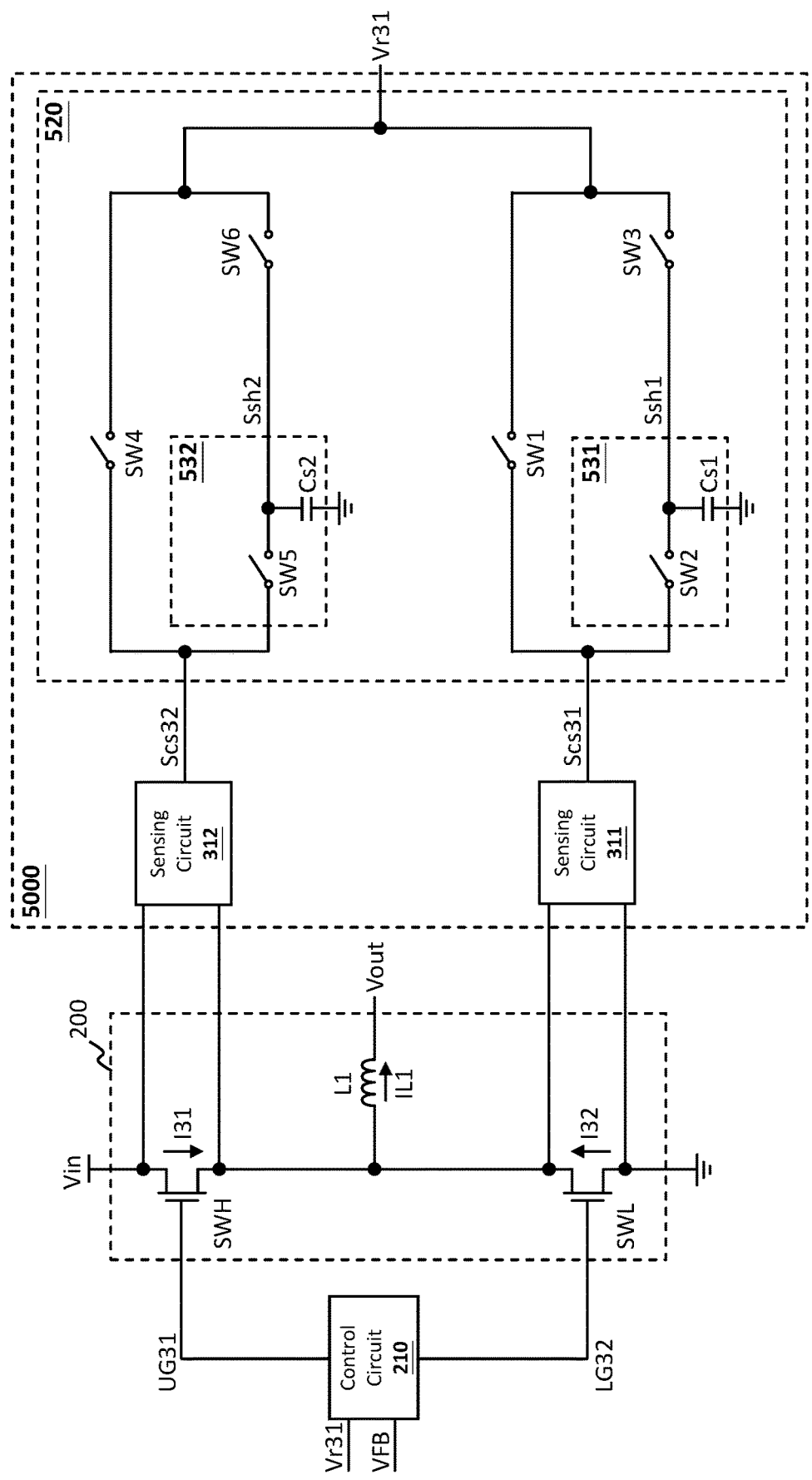
FIG. 7 shows a schematic block diagram of an inductor current emulator circuit according to another embodiment of the present invention.

Please refer to FIG. 7, which shows a schematic block diagram of an inductor current emulator circuit according to another embodiment of the present invention. In one embodiment, the inductor current emulator circuit 5000 comprises: a sensing circuit 311, a sensing circuit 312 and an emulation control circuit 520. In one embodiment, the emulation control circuit 520 includes: an emulation sample-and-hold circuit 531, an emulation sample-and-hold circuit 532, a switch SW1, a switch SW3, a switch SW4 and a switch SW6. In one embodiment, the emulation sample-and-hold circuit 531 includes: an emulation sample-and-hold capacitor Cs1 and an emulation sample-and-hold switch SW2, whereas, the emulation sample-and-hold circuit 532 includes: an emulation sample-and-hold capacitor Cs2 and an emulation sample-and-hold switch SW5. The emulation sample-and-hold circuit 531 and the switch SW1 are coupled in parallel to the sensing circuit 311. The switch SW3 is coupled in series to the emulation sample-and-hold circuit 531. The emulation sample-and-hold circuit 532 and the switch SW4 are coupled in parallel to the sensing circuit 312. The switch SW6 is coupled in series to the emulation sample-and-hold circuit 532.

As shown in FIG. 7, in one embodiment, a control circuit 210 is configured to operably generate a switch control signal UG31 and a switch control signal LG32. The ON-state of an upper gate switch SWH is controlled by the switch control signal UG31, whereas, the ON-state of a lower gate switch SWL is controlled by the switch control signal LG32. In this embodiment, the inductor current emulator circuit 5000 is configured to operably generate the current emulation signal Vr31 for emulating an inductor current IL1 flowing through an inductor L1. The upper gate switch SWH has an ON-current I31 when the upper gate switch SWH is ON during an ON-time, whereas, the lower gate switch SWL has an ON-current I32 when the lower gate switch SWL is ON during an ON-time. In one embodiment, the sensing circuit 311 is coupled to the lower gate switch SWL, and the sensing circuit 311 is configured to operably sense the ON-current I31 of the lower gate switch SWL, to generate a current sensing signal Scs32.

Figure 8A:
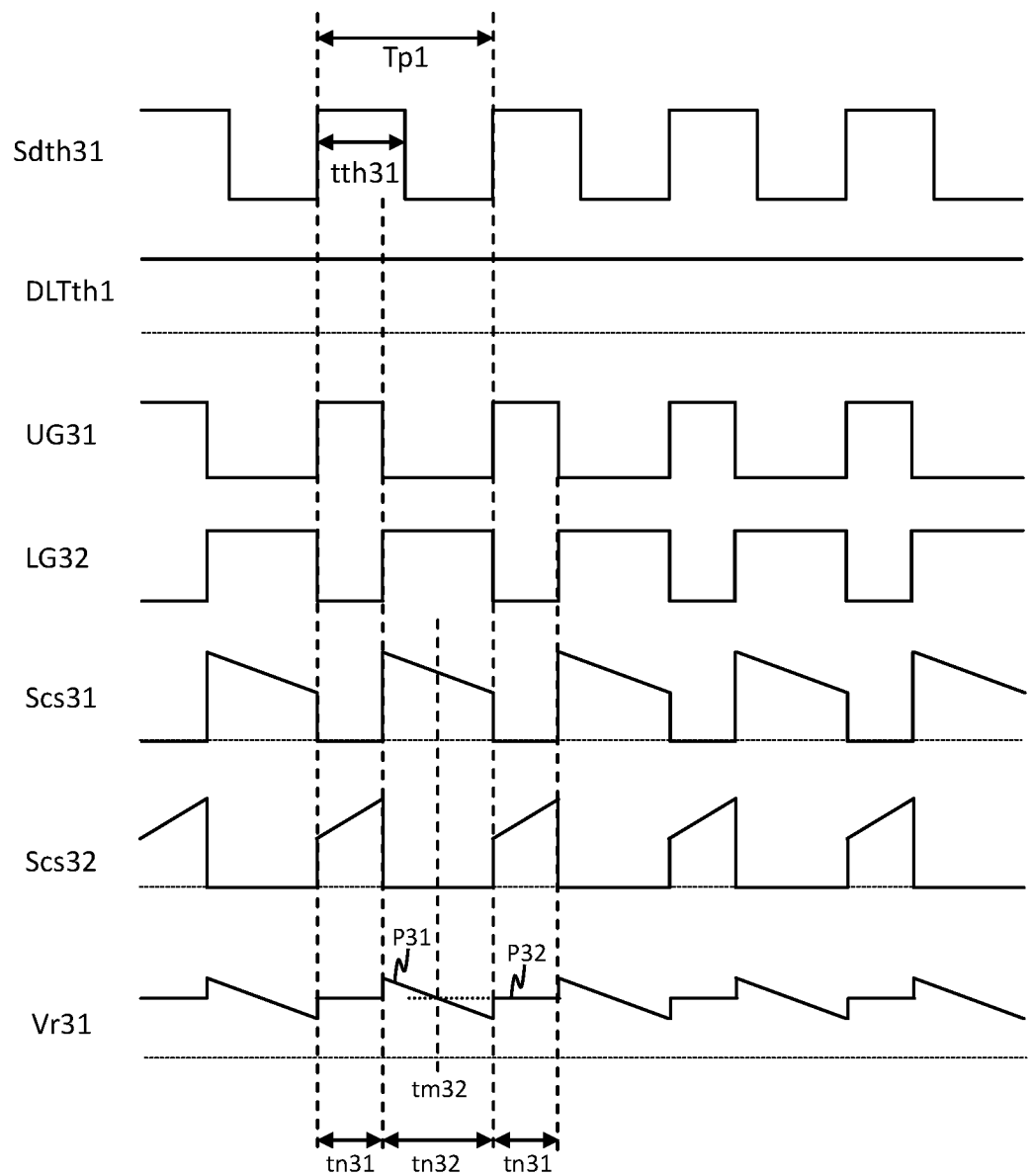
FIG. 8A to FIG. 8E illustrate signal waveform diagrams depicting the operation of the inductor current emulator circuit of FIG. 7 according to several embodiments of the present invention.

Please refer to FIG. 7 along with FIG. 8A. FIG. 8A illustrates a signal waveform diagram depicting the operation of the inductor current emulator circuit of FIG. 7. In one embodiment, as shown in FIG. 8A, the switching period of the upper gate switch SWH and the lower gate switch SWL is denoted as period Tp1. In one embodiment, the upper gate switch SWH has an ON-current I31 when the upper gate switch SWH is ON during an ON-time tn31, whereas, the lower gate switch SWL has an ON-current I32 when the lower gate switch SWL is ON during an ON-time tn32. In one embodiment, in a case when the duty ratio DH (i.e., tn31/Tp1) of the upper gate switch SWH is smaller than a duty ratio threshold Dth31 (i.e., as shown in FIG. 8A, the ON-time tn31 of the upper gate switch SWH is shorter than the enable period tth31 of duty ratio threshold signal Sdth31), the emulation control circuit 520 controls the switch SW1 to be ON during the ON-time tn32, so as to generate a first part P31 of the current emulation signal Vr31 according to the current sensing signal Scs31, and at an intermediate time point tm32 within the ON-time tn32, the emulation control circuit 520 controls the emulation sample-and-hold switch SW2 in the emulation sample-and-hold circuit 531 to be OFF, to sample-and-hold the current sensing signal Scs31 to generate a sample-and-hold signal Ssh1; further, the emulation control circuit 520 controls the switch SW3 to be ON during a following ON-time tn31, so as to generate a second part P32 of the current emulation signal Vr31 according to the sample-and-hold signal Ssh1. The duty ratio threshold Dth31 is equal to tth31/Tp1. In one embodiment, the duty ratio threshold Dth31 is equal to 50%.

Figure 8B:
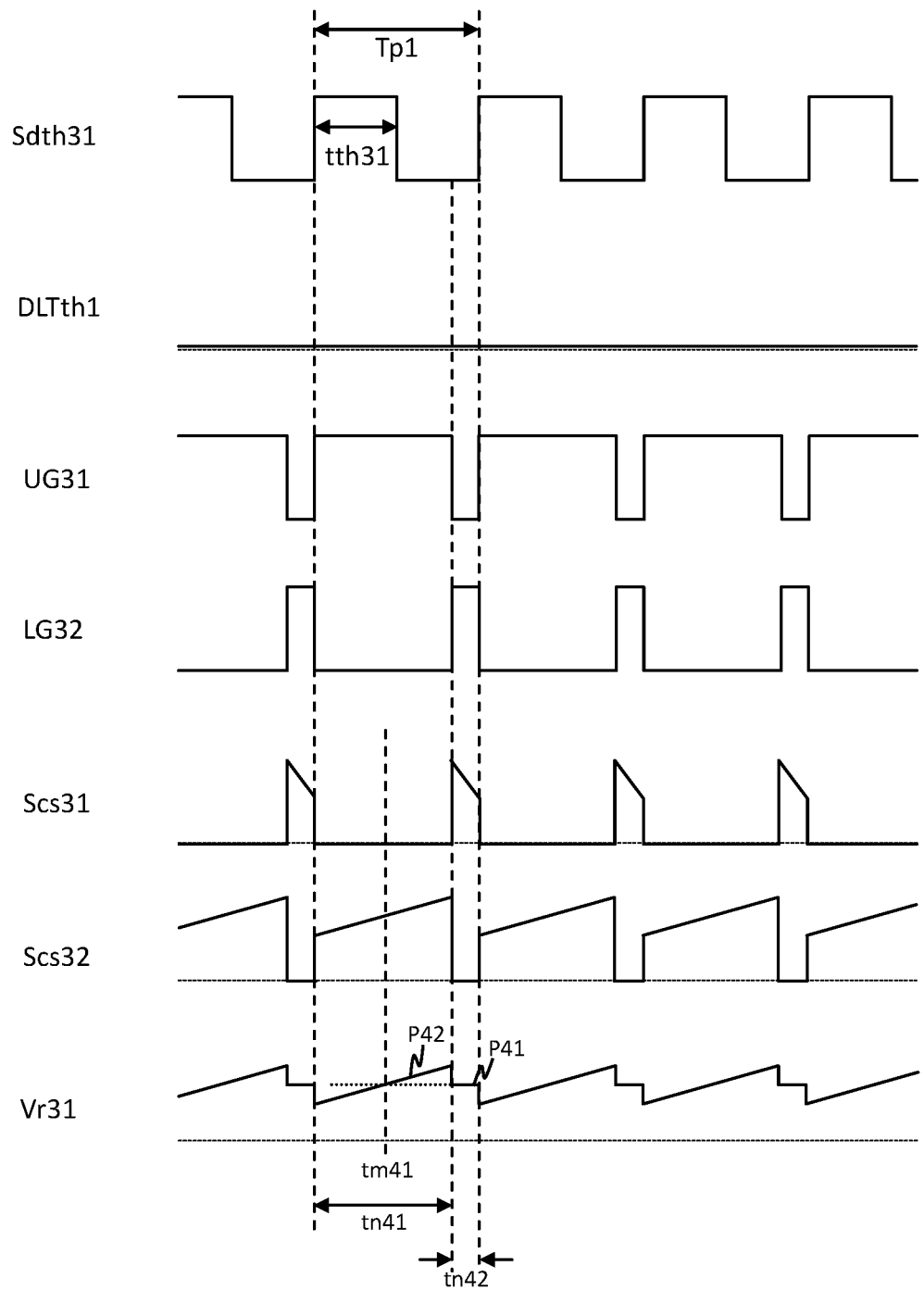

Please refer to FIG. 7 along with FIG. 8B. FIG. 8B illustrates a signal waveform diagram depicting the operation of the inductor current emulator circuit of FIG. 7. In one embodiment, as shown in FIG. 8B, the switching period of the upper gate switch SWH and the lower gate switch SWL is denoted as period Tp1. In one embodiment, the upper gate switch SWH has an ON-current I31 when the upper gate switch SWH is ON during an ON-time tn41, whereas, the lower gate switch SWL has an ON-current I32 when the lower gate switch SWL is ON during an ON-time tn42. In one embodiment, in a case when the duty ratio DH (i.e., tn41/Tp1) of the upper gate switch SWH is greater than a duty ratio threshold Dth31 (i.e., as shown in FIG. 8B, the ON-time tn41 of the upper gate switch SWH is longer than an enable period tth31 of duty ratio threshold signal Sdth31), the emulation control circuit 520 controls the switch SW4 to be ON during the ON-time tn41, so as to generate a second part P42 of the current emulation signal Vr31 according to the current sensing signal Scs32, and at an intermediate time point tm41 within the ON-time tn41, the emulation control circuit 520 controls the emulation sample-and-hold switch SW5 in the emulation sample-and-hold circuit 531 to be OFF, to sample-and-hold the current sensing signal Scs32 to generate a sample-and-hold signal Ssh2, and the emulation control circuit 520 further controls the switch SW6 to be ON during the following ON-time tn42, so as to generate a first part P41 of the current emulation signal Vr31 according to the sample-and-hold signal Ssh2.

Figure 8C:
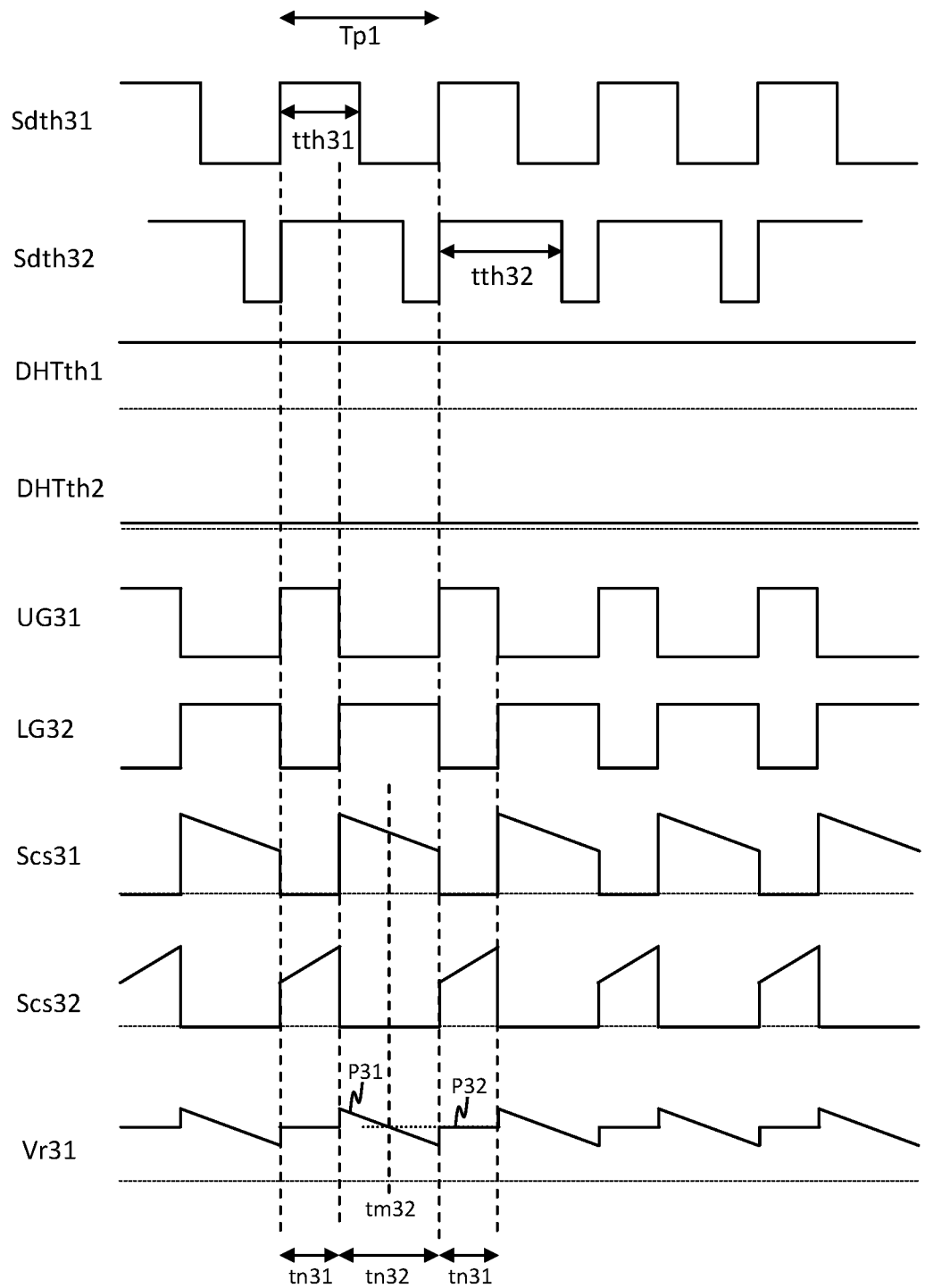
Figure 8D:
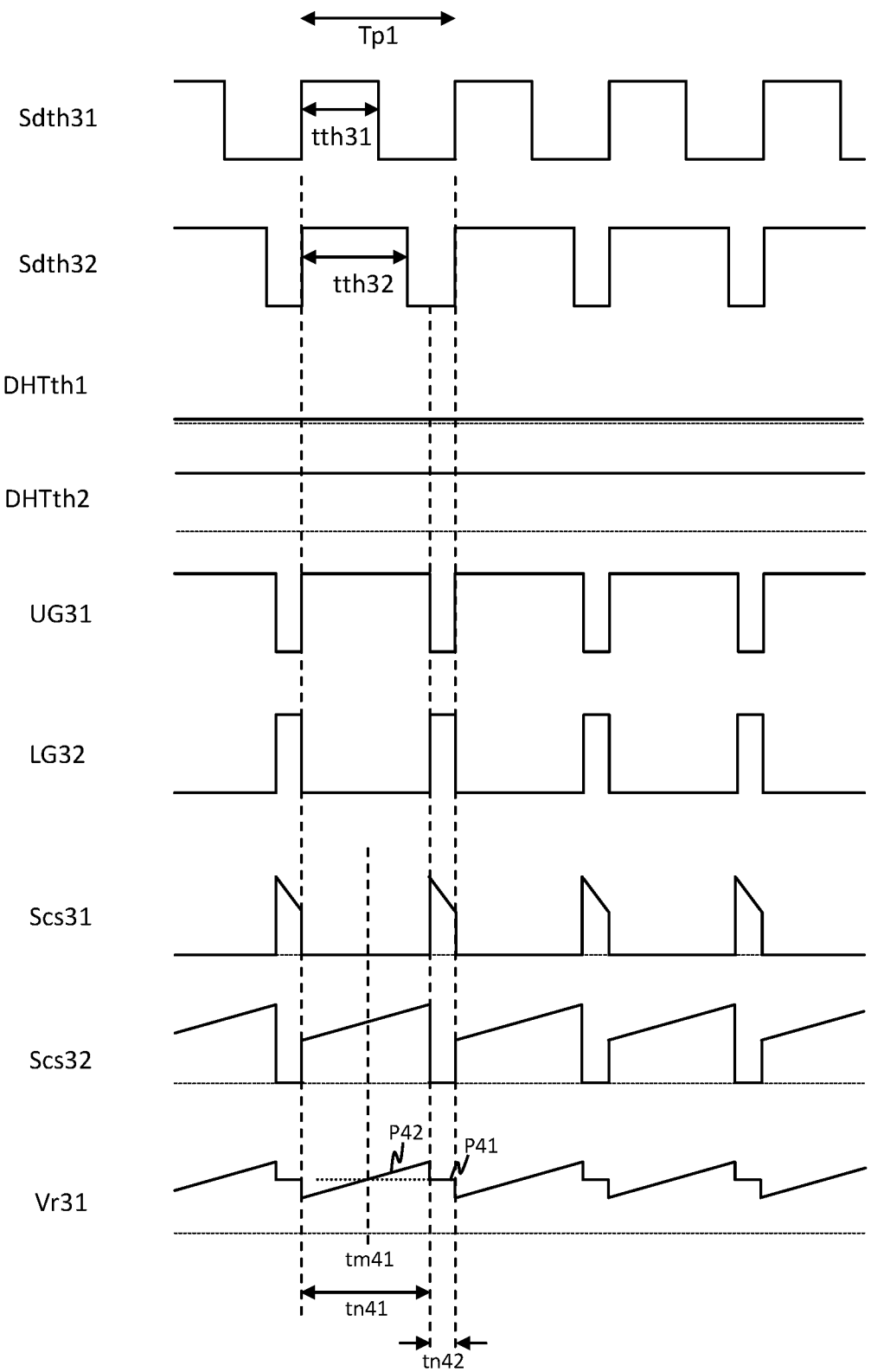
Figure 8E:
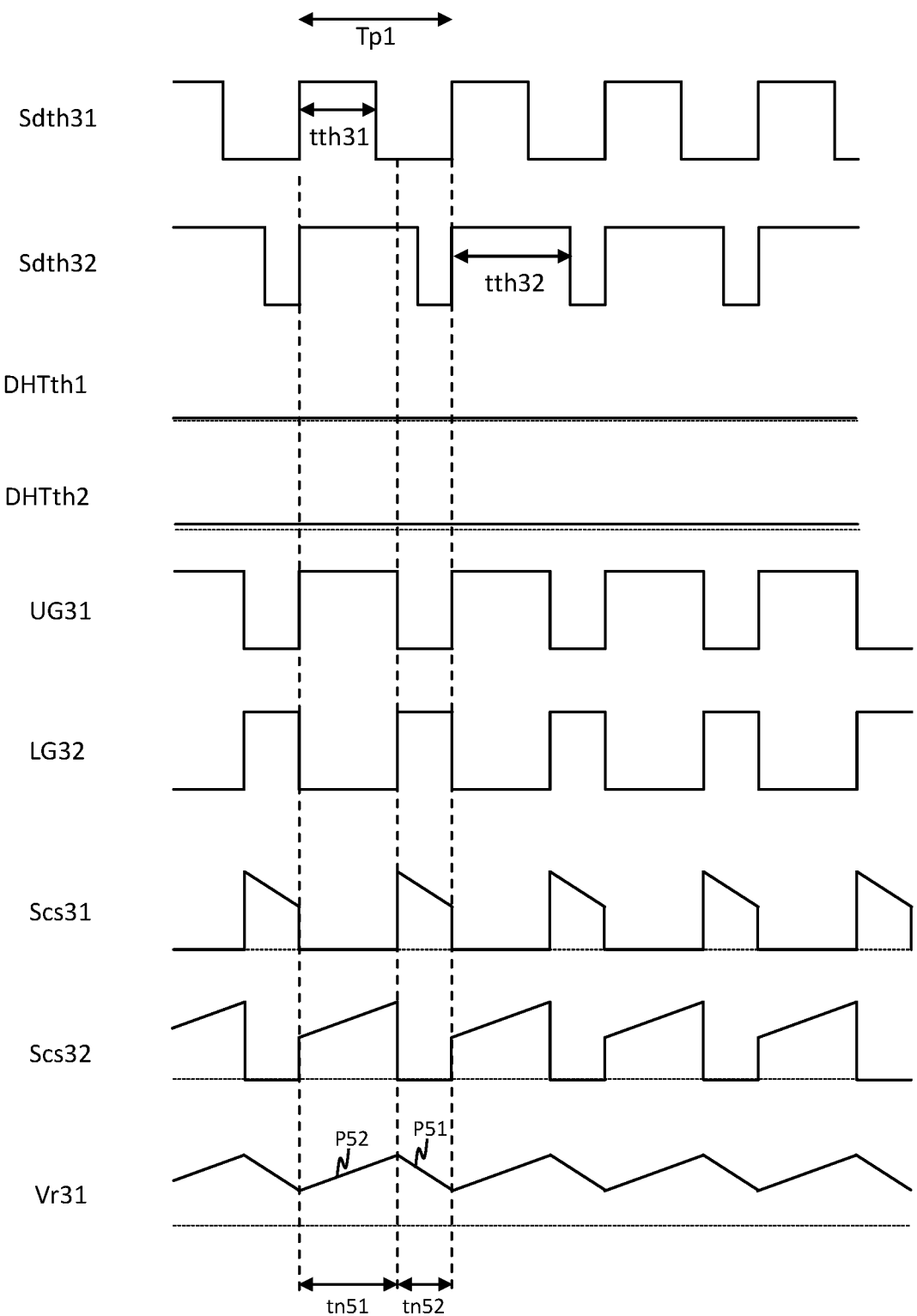

Please refer to FIG. 7 along with FIG. 8C to FIG. 8E. FIG. 8C to FIG. 8E illustrate signal waveform diagrams depicting the operation of the inductor current emulator circuit of FIG. 7 according to several other embodiments of the present invention. FIG. 8C and FIG. 8D are similar to FIG. 8A and FIG. 8B respectively, but are different in that: each of the embodiments shown in FIG. 8C and FIG. 8D includes plural duty ratio thresholds, namely, duty ratio thresholds Dth31 and Dth32 (wherein Dth31=tth31/Tp1 and Dth32=tth32/Tp1). In one embodiment, the duty ratio threshold Dth32 is greater than the duty ratio threshold Dth31.

As shown in FIG. 8C, in one embodiment, in a case when the duty ratio DH (i.e., tn31/Tp1) of the upper gate switch SWH is smaller than the duty ratio threshold Dth31 (and smaller than the duty ratio threshold Dth32), i.e., the ON-time tn31 of the upper gate switch SWH is shorter than the enable period tth31 of duty ratio threshold signal Sdth31, the current emulation signal Vr31 generated by the emulation control circuit 520 is the same as what is shown in FIG. 8A. That is, the first part P31 of the current emulation signal Vr31 during the ON-time tn32 of the lower gate switch SWL is directly obtained from the current sensing signal Scs31, whereas, the second part P32 of the current emulation signal Vr31 during the ON-time tn31 of the upper gate switch SWH is generated according to the sample-and-hold signal Ssh1.

As shown in FIG. 8D, in one embodiment, in a case when the duty ratio DH (i.e., tn41/Tp1) of the upper gate switch SWH is greater than the duty ratio threshold Dth32 (and greater than the duty ratio threshold Dth31), i.e., the ON-time tn41 of the upper gate switch SWH is longer than the enable period tth32 of duty ratio threshold signal Sdth32, the current emulation signal Vr31 generated by the emulation control circuit 520 is the same as what is shown in FIG. 8B. That is, the first part P41 of the current emulation signal Vr31 during the ON-time tn42 of the lower gate switch SWL is generated according to the sample-and-hold signal Ssh2, whereas, the second part P42 of the current emulation signal Vr31 during the ON-time tn41 of the upper gate switch SWH is directly obtained from the current sensing signal Scs32.

As shown in FIG. 8E, in one embodiment, the switching period of the upper gate switch SWH and the lower gate switch SWL is denoted as period Tp1. In one embodiment, the upper gate switch SWH has an ON-current I31 when the upper gate switch SWH is ON during the ON-time tn51, whereas, the lower gate switch SWL has an ON-current I32 when the lower gate switch SWL is ON during the ON-time tn52. In one embodiment, in a case when the duty ratio DH (i.e., tn51/Tp1) of the upper gate switch SWH is greater than the duty ratio threshold Dth31 and smaller than the duty ratio threshold Dth32, the emulation control circuit 520 controls the switch SW4 to be ON during the ON-time tn51 of the upper gate switch SWH, so as to generate the second part P52 of the current emulation signal Vr31 according to the current sensing signal Scs32, and the emulation control circuit 520 controls the switch SW1 to be ON during the ON-time tn52 of the lower gate switch SWL, so as to generate the first part P51 of the current emulation signal Vr31 according to the current sensing signal Scs31.

It is worthwhile noting that, in the embodiment shown in FIG. 8E, in the case when the duty ratio DH of the upper gate switch SWH lies between the duty ratio threshold Dth31 and the duty ratio threshold Dth32, both sensing the ON-current of the upper gate switch SWH and sensing the ON-current of the lower gate switch SWL can obtain a satisfying accurate result without any concern of insufficient bandwidth. Hence, in this embodiment, the first part of the current emulation signal Vr31 and the second part of the current emulation signal Vr31 are both generated according to the current sensing signal, without emulation.

From one perspective, when the duty ratio threshold Dth32 is equal to the duty ratio threshold Dth31, the embodiment shown in FIG. 8C and the embodiment shown in FIG. 8D correspond to the embodiment shown in FIG. 8A and the embodiment shown in FIG. 8B, respectively.

It is worthwhile noting that, in a case when a duty ratio of a switch in the power stage circuit is small to a certain extent, it becomes imprecise to sense the ON-current of such switch due to insufficient bandwidth. To overcome this, when a duty ratio of a switch in the power stage circuit is small to a certain extent, the present invention (e.g., the embodiments shown in FIG. 8A to FIG. 8D) instead senses an ON-current of a switch having a greater duty ratio during its ON-time, to constitute a part of the current sensing signal; further at an intermediate time point of the ON-time of the switch having a greater duty ratio, the present invention samples-and-holds the level of the current sensing signal, to constitute another part of the current sensing signal. Because the ON-current of the switch having a greater duty ratio can be precisely sensed, to sample-and-hold the intermediate time point of the ON-time of such switch can provide a precise information for accurately emulating the ON-current of the switch having a smaller duty ratio.

Figure 9:
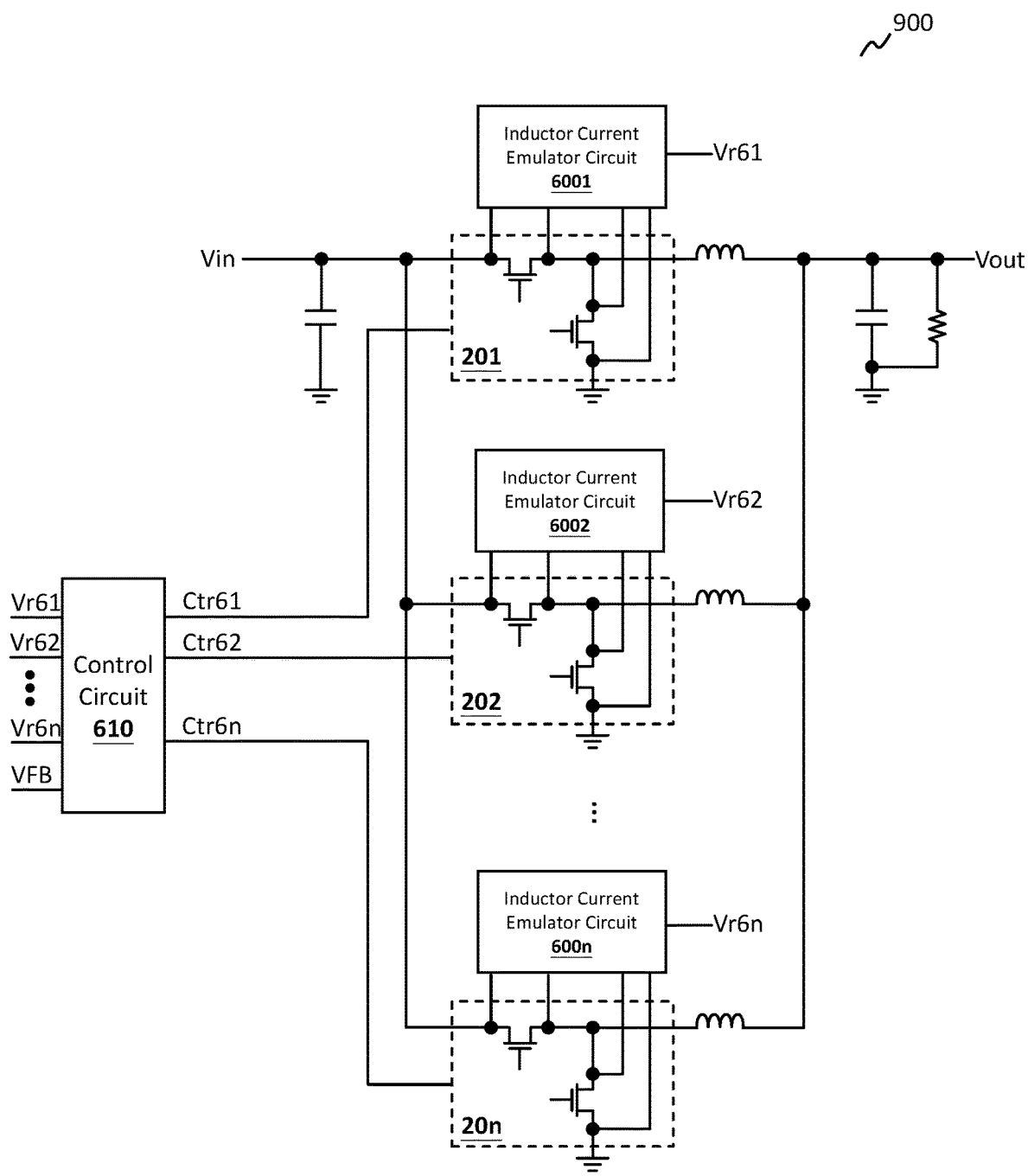
FIG. 9 shows a schematic diagram depicting that an inductor current emulator circuit is applied in a multi-phase power converter according to an embodiment of the present invention.

Please refer to FIG. 9, which shows a schematic diagram depicting that an inductor current emulator circuit is applied in a multi-phase power converter according to an embodiment of the present invention. In one embodiment, the inductor current emulator of the present invention circuit can be applied in for example a multi-phase power converter 900 shown in FIG. 9. The multi-phase power converter 900 includes: a control circuit 610, n power stage circuits (201~20n) and n inductor current emulator circuits (6001~600n) corresponding to the n power stage circuits (201~20n), wherein n is a positive integer greater than one. The n inductor current emulator circuits 6001~600n serve to respectively generate current emulation signals Vr61~Vr6n. The control circuit 610 is configured to operably generate control signals Ctr61~Ctr6n according to a feedback signal VFB and the current emulation signals Vr61~Vr6n, wherein the control signals Ctr61~Ctr6n serve to respectively control the switches in corresponding power stage circuits 201~20n. In this embodiment, the inductor current emulator circuits 6001~600n are respectively coupled to the switches in corresponding power stage circuits 201~20n. Operation details of each group of the power stage circuit and the corresponding inductor current emulator circuit are as described in the aforementioned embodiments. In one embodiment, a current balancing operation and a phase shedding operation of the power stage circuits 201~20n are determined according to the corresponding current emulation signal Vr61~Vr6n generated by the inductor current emulator circuit 6001~600n.

Figure 10A:
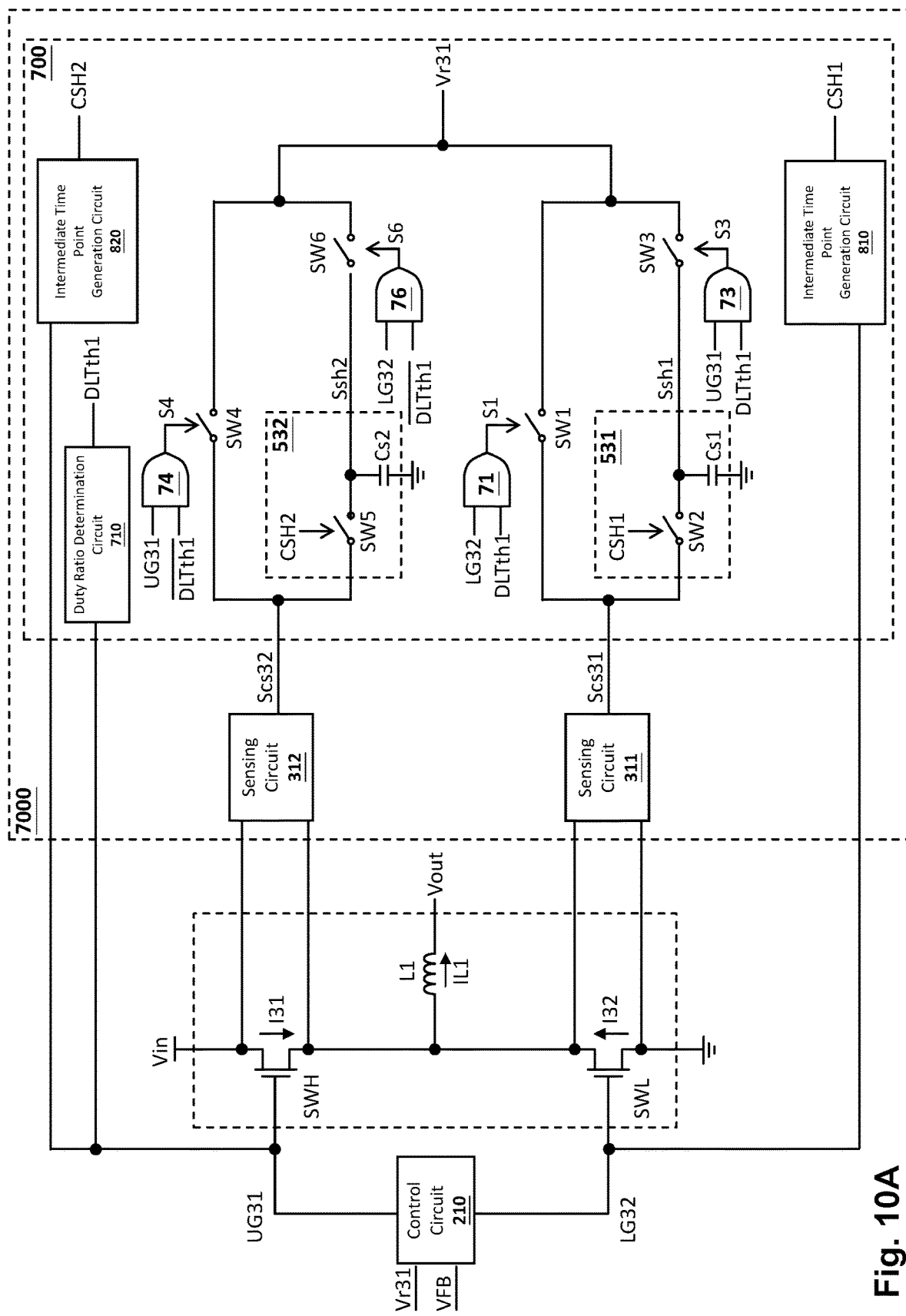
FIG. 10A shows a schematic block diagram of an inductor current emulator circuit according to yet another embodiment of the present invention.

Please refer to FIG. 10A, which shows a schematic block diagram of an inductor current emulator circuit according to yet another embodiment of the present invention. The inductor current emulator circuit 7000 of this embodiment shown in FIG. 10A is similar to the inductor current emulator circuit 5000 of the embodiment shown in FIG. 7, but is different in that: in this embodiment, the emulation control circuit 700 in the inductor current emulator circuit 7000 further includes: a duty ratio determination circuit 710, an intermediate time point generation circuit 810 and an intermediate time point generation circuit 820.

In one embodiment, the duty ratio determination circuit 710 is configured to operably generate a first comparison signal DLTth1 according to the switch control signal UG31. The intermediate time point generation circuit 810 is configured to operably generate a sample-and-hold control signal CSH1 according to the switch control signal LG32. The intermediate time point generation circuit 820 is configured to operably generate a sample-and-hold control signal CSH2 according to the switch control signal UG31. In one embodiment, when the first comparison signal DLTth1 is enabled, it indicates that the duty ratio DH of the upper gate switch SWH is smaller than the duty ratio threshold Dth31.

In one embodiment, the sample-and-hold control signal CSH1 is configured to operably control an emulation sample-and-hold switch SW2 in an emulation sample-and-hold circuit 531, so as to sample-and-hold a current sensing signal Scs31. On the other hand, the sample-and-hold control signal CSH2 is configured to operably control an emulation sample-and-hold switch SW5 in an emulation sample-and-hold circuit 532, so as to sample-and-hold a current sensing signal Scs32. In one embodiment, an on state of a switch SW1, an on state of a switch SW3, an on state of a switch SW4 and an on state of a switch SW6 are controlled by a signal S1, a signal S3, a signal S4 and a signal S6, respectively. In one embodiment, an AND gate 71 is configured to operably generate the signal S1 according to the switch control signal LG32 and the first comparison signal DLTth1. An AND gate 73 is configured to operably generate the signal S3 according to the switch control signal UG31 and the first comparison signal DLTth1. An AND gate 74 is configured to operably generate the signal S4 according to the switch control signal UG31 and an inverting signal of the first comparison signal DLTth1. An AND gate 76 is configured to operably generate the signal S6 according to the switch control signal LG32 and the inverting signal of the first comparison signal DLTth1.

Please refer to FIG. 10A in conjunction with FIG. 8A and FIG. 8B. For example, in the embodiment shown in FIG. 8A, when the first comparison signal DLTth1 is enabled, it indicates that the duty ratio DH of the upper gate switch SWH is smaller than a duty ratio threshold Dth31. In the embodiment shown in FIG. 8B, when the first comparison signal DLTth1 is disabled, it indicates that the duty ratio DH of the upper gate switch SWH is greater than the duty ratio threshold Dth31. In one embodiment, the period of a duty ratio threshold signal Sdth31 is equal to the switching period of the switch control signal UG31, wherein the duty ratio of the threshold signal Sdth31 when the threshold signal Sdth31 is enabled is equal to the duty ratio threshold Dth31.

Figure 10B:
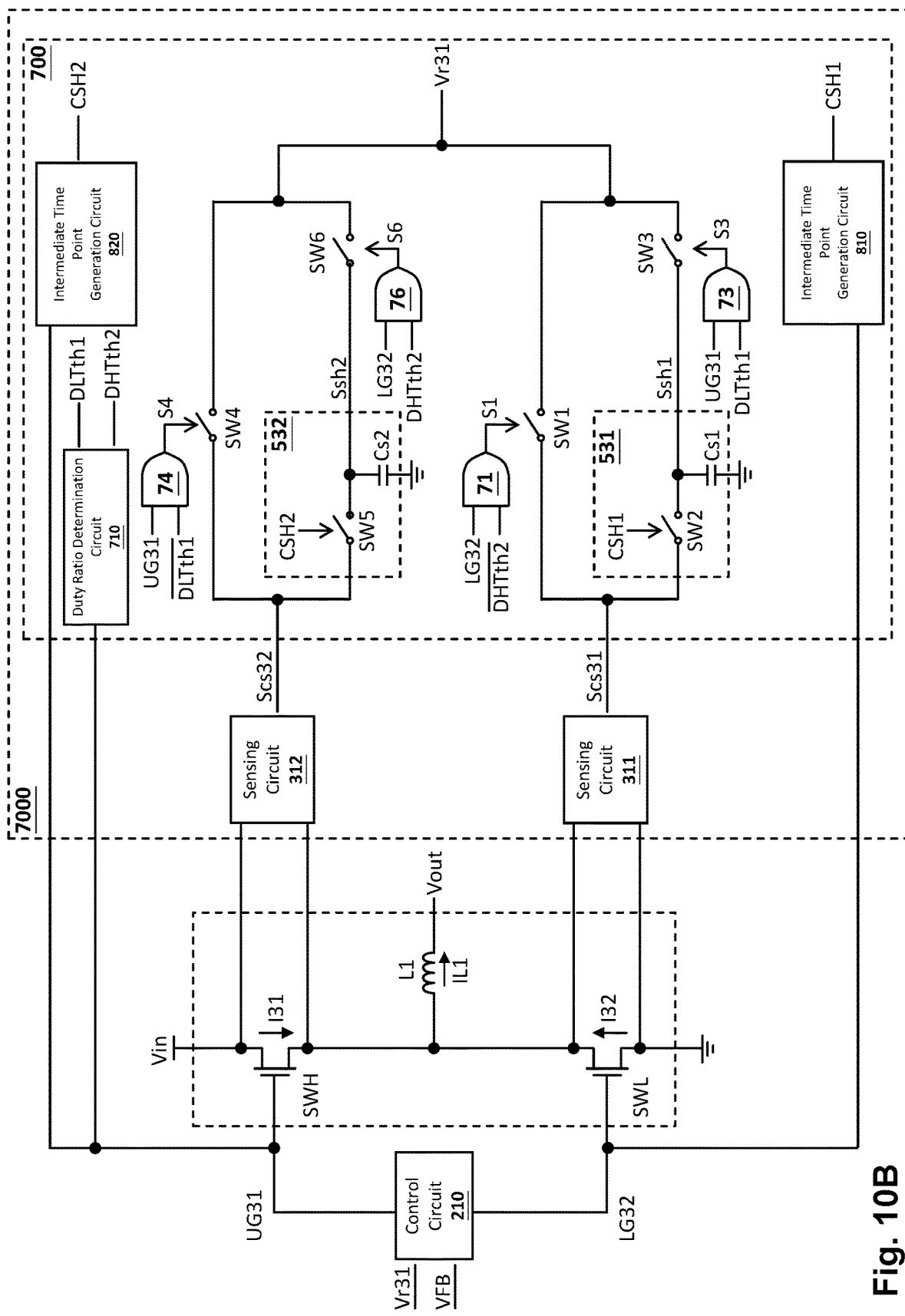
FIG. 10B shows a schematic block diagram of an inductor current emulator circuit according to still another embodiment of the present invention.

Please refer to FIG. 10B, which shows a schematic block diagram of an inductor current emulator circuit according to still another embodiment of the present invention. The inductor current emulator circuit of this embodiment shown in FIG. 10B is similar to the inductor current emulator circuit of the embodiment shown in FIG. 10A, but is different in that: in the embodiment shown in FIG. 10B, a duty ratio determination circuit 720 is configured to operably generate a first comparison signal DLTth1 and a second comparison signal DLTth2 according to the switch control signal UG31. In this embodiment, when the first comparison signal DLTth1 is enabled, it indicates that the duty ratio DH of the upper gate switch SWH is smaller than the duty ratio threshold Dth31, whereas, when the second comparison signal DLTth2 is enabled, it indicates that the duty ratio DH of the upper gate switch SWH is greater than the duty ratio threshold Dth31.

Additionally, in this embodiment, the AND gate 71 is configured to operably generate the signal S1 according to the switch control signal LG32 and an inverting signal of the second comparison signal DLTth2. The AND gate 73 is configured to operably generate the signal S3 according to the switch control signal UG31 and the first comparison signal DLTth1. The AND gate 74 is configured to operably generate the signal S4 according to the switch control signal UG31 and an inverting signal of the first comparison signal DLTth1. The AND gate 76 is configured to operably generate the signal S6 according to the switch control signal LG32 and the second comparison signal DLTth2.

Please refer to FIG. 8C along with FIG. 8D. Note that the embodiments shown in FIG. 8C and FIG. 8D correspond to the embodiment shown in FIG. 10B. In the embodiment shown in FIG. 8C, when the first comparison signal DLTth1 is enabled, it indicates that the duty ratio DH of the upper gate switch SWH is smaller than the duty ratio threshold Dth31, whereas, when the second comparison signal DLTth2 is disabled, it indicates that the duty ratio DH of the upper gate switch SWH is smaller than a duty ratio threshold Dth32. In the embodiment shown in FIG. 8D, when the first comparison signal DLTth1 is disabled, it indicates that the duty ratio DH of the upper gate switch SWH is greater than the duty ratio threshold Dth31, whereas, when the second comparison signal DLTth2 is enabled, it indicates that the duty ratio DH of the upper gate switch SWH is greater than the duty ratio threshold Dth32. In the embodiment shown in FIG. 8E, when the first comparison signal DLTth1 and the second comparison signal DLTth2 are both disabled, it indicates that the duty ratio DH of the upper gate switch SWH is greater than the duty ratio threshold Dth31 and smaller than the duty ratio threshold Dth32. In one embodiment, the period of the duty ratio threshold signal Sdth32 is equal to the switching period of the switch control signal UG31, wherein the duty ratio of the duty ratio threshold signal Sdth32 when the duty ratio threshold signal Sdth32 is enabled is equal to the duty ratio threshold Dth32.

Figure 11:
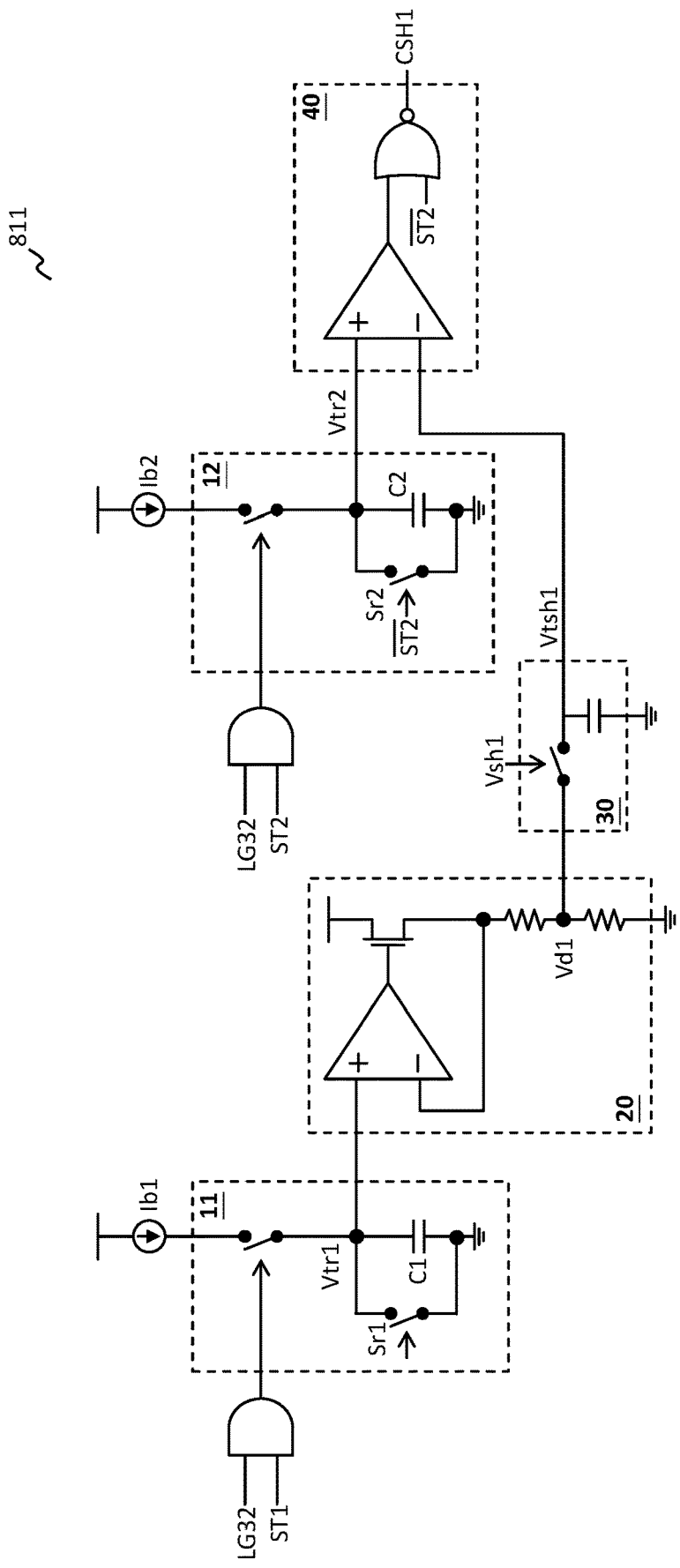
FIG. 11 shows a schematic diagram of an intermediate time point generation circuit in an inductor current emulator circuit according to an embodiment of the present invention.

Please refer to FIG. 11, which shows a schematic diagram of an intermediate time point generation circuit in an inductor current emulator circuit according to an embodiment of the present invention. The intermediate time point generation circuit 811 shown in FIG. 11 is a specific embodiment of the intermediate time point generation circuit 810 shown in FIG. 10A. The intermediate time point generation circuit 820 shown in FIG. 10A also can be implemented similarly to the intermediate time point generation circuit 811 shown in FIG. 11. Please refer to FIG. 11 and FIG. 8C. The intermediate time point generation circuit 811 is configured to operably indicate an intermediate time point tm32 within an ON-time tn32. The intermediate time point generation circuit 811 includes: an integrator 11, a voltage buffer and conversion circuit 20, a timing sample-and-hold circuit 30, an integrator 12 and a comparison circuit 40.

Figure 12:
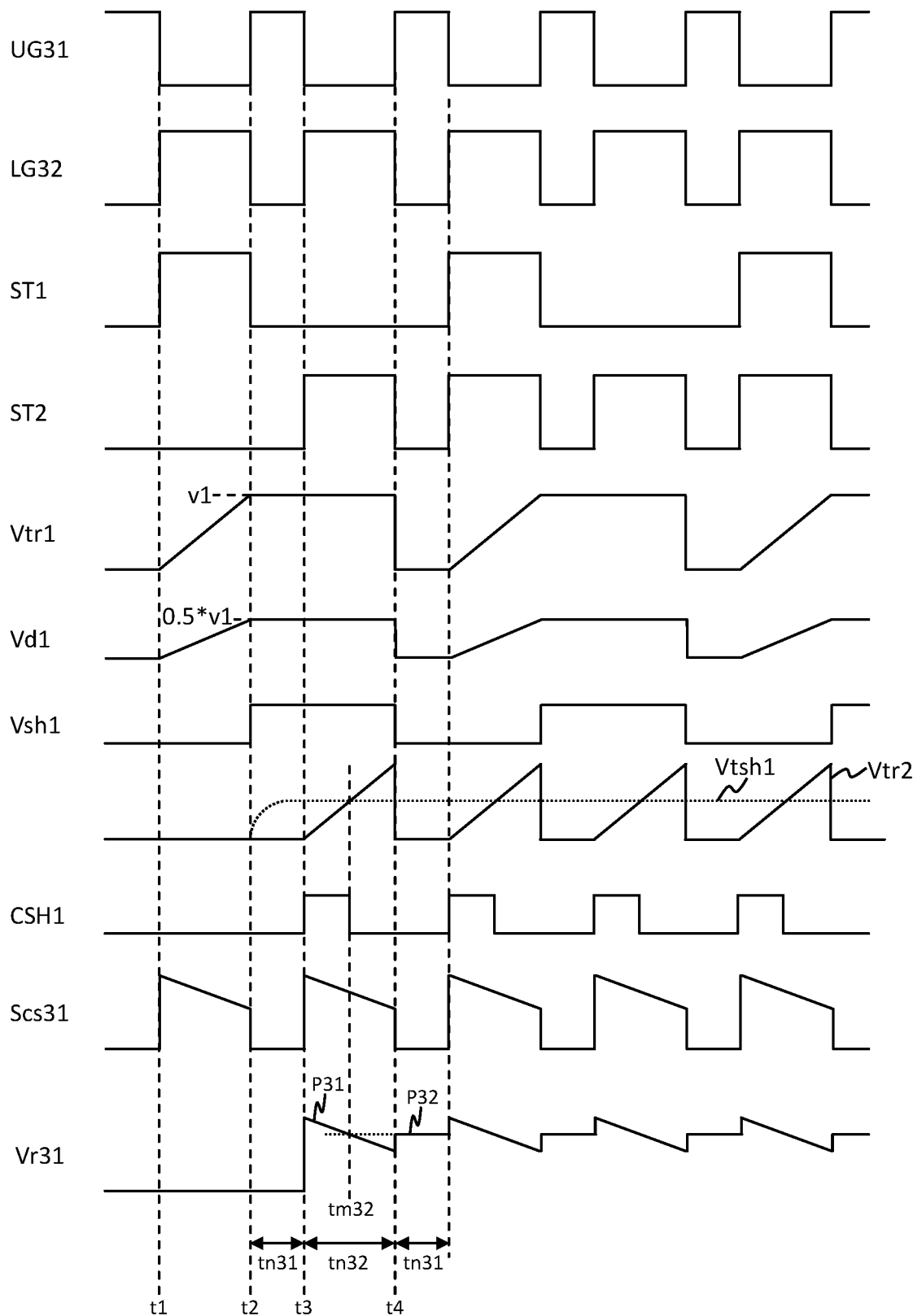
FIG. 12 illustrates a signal waveform diagram depicting the operation of the intermediate time point generation circuit of FIG. 11.

Please refer to FIG. 11 along with FIG. 12. FIG. 12 illustrates a signal waveform diagram depicting the operation of the intermediate time point generation circuit of FIG. 11. In one embodiment, the integrator 11 is configured to operably execute an integration operation on a current source Ib1 via an integration capacitor C1 according to a clock signal ST1 and a switch control signal LG32 (via an AND gate), to generate a timing ramp signal Vtr1 during an enable period (e.g., from time point t1 to time point t2 in FIG. 12) of the clock signal ST1, wherein a level of the timing ramp signal Vtr1 at an end time point of the enable period of the clock signal ST1 is proportional to a time length of the enable period of the clock signal ST1. For example, as shown in the embodiment shown in FIG. 12, the level of the timing ramp signal Vtr1 at the time point t2 is proportional to the time length from the time point t1 to the time point t2. In one embodiment, the clock signal ST1 is generated according to the switch control signal LG32. The enable period of the clock signal ST1 corresponds to at least one ON-time tn32. For example, as shown in the embodiment shown in FIG. 12, one of every two ON-times tn32 corresponds to an enable period of the clock signal ST1. In one embodiment, the integrator 11 includes: a reset switch Sr1, which is configured to operably discharge and reset the integration capacitor C1, which is the period in which the timing ramp signal Vtr1 is at low level as shown in FIG. 12.

In one embodiment, the voltage buffer and conversion circuit 20 is configured to operably buffer and convert the timing ramp signal Vtr1, to generate a divided-voltage signal Vd1, wherein the divided-voltage signal Vd1 has a first voltage division ratio to the timing ramp signal Vtr1. In this embodiment, the high level of the timing ramp signal Vtr1 is for example equal to v1 and the high level of the divided-voltage signal Vd1 is for example equal to 0.5*v1; thus, the first voltage division ratio is equal to 0.5. In one embodiment, the timing sample-and-hold circuit 30 is configured to operably sample-and-hold a level (which is equal to 0.5*v1) of the divided-voltage signal Vd1 according to a control signal Vsh1 at the end time point (e.g., the time point t2) of the enable period of the clock signal ST1, to generate a timing sample-and-hold signal Vtsh1 (as indicated by a dotted line in the eighth signal waveform shown in FIG. 12), wherein the control signal Vsh1 turns to an enable state at the end time point of the enable period of the clock signal ST1 and the control signal Vsh1 turns to a disable state at the end time point of the enable period of a following clock signal ST2. In one embodiment, the period of the control signal Vsh1 is 2-fold of the switching period of the switch control signal (UG31 or LG32). In other words, in this embodiment, the timing sample-and-hold signal Vtsh1 is updated every two switching periods.

In one embodiment, the integrator 12 is configured to operably execute an integration operation on a current source Ib2 via an integration capacitor C2 according to the clock signal ST2 and the switch control signal LG32 (via an AND gate) during an enable period (e.g., from time point t3 to time point t4 in FIG. 12) of the clock signal ST2, to generate a timing ramp signal Vtr2 (as indicated by a solid line in the eighth signal waveform shown in FIG. 12). In one embodiment, the clock signal ST2 is generated according to the switch control signal LG32. The enable period of the clock signal ST2 corresponds to at least one ON-time tn32 and is subsequent to the enable period of the clock signal ST1. For example, as shown in in the embodiment shown in FIG. 12, the time point t3 at which the clock signal ST2 starts being enabled is subsequent to the time point t1 at which the clock signal ST1 starts being enabled. And, after the time point t3, each ON-time tn32 corresponds to one enable period of the clock signal ST2.

In one embodiment, the comparison circuit 40 is configured to operably generate a sample-and-hold control signal CSH1 according to the timing sample-and-hold signal Vtsh1 and the timing ramp signal Vtr2, wherein the sample-and-hold control signal CSH1 indicates a time point at which the timing sample-and-hold signal CSH1 is equal to the timing ramp signal Vtr2, wherein the time point at which the timing sample-and-hold signal CSH1 is equal to the timing ramp signal Vtr2 corresponds to the intermediate time point tm32 within the ON-time tn32. To be more specific, as shown in FIG. 10A and FIG. 12, in one embodiment, the sample-and-hold control signal CSH1 controls an emulation sample-and-hold switch SW2 to sample-and-hold the current sensing signal Scs31 at the intermediate time point tm32 within the ON-time tn32, thus generating the sample-and-hold signal Ssh1. In one embodiment, the first voltage division ratio, a level of the current source Ib1, a capacitance of the integration capacitor C1 in the integrator 11, a level of the current source Ib2 and a capacitance of the integration capacitor C2 in the integrator 12 decide the time length that the timing ramp signal Vtr2 takes to reach the timing sample-and-hold signal Vtsh1. In one embodiment, the integrator 12 includes: a reset switch Sr2, which is configured to operably discharge and reset the integration capacitor C2 during an disable period of the clock signal ST2.

Figure 13A:
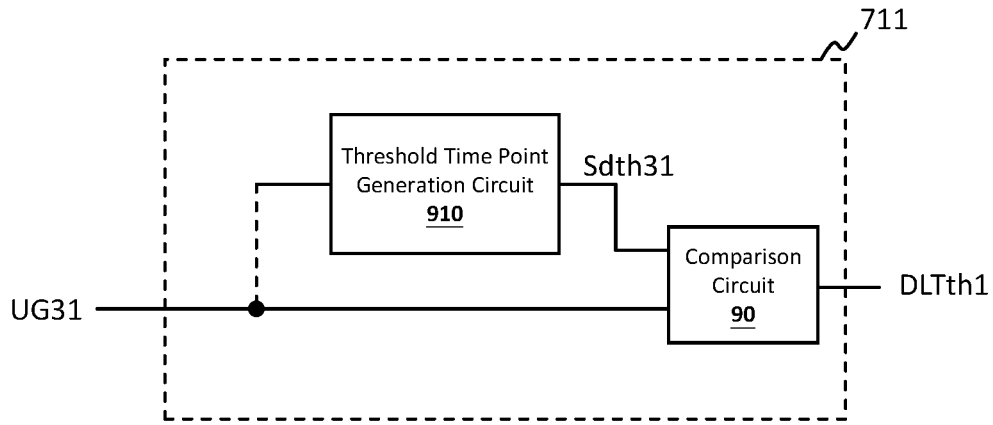
FIG. 13A and FIG. 13B show two schematic block diagrams of a duty ratio determination circuit in an inductor current emulator circuit according to two embodiments of the present invention, respectively.

Please refer to FIG. 13A, which shows a schematic block diagram of a duty ratio determination circuit in an inductor current emulator circuit according to an embodiment of the present invention. The duty ratio determination circuit 711 shown in FIG. 13A is a specific embodiment of the duty ratio determination circuit 710 shown in FIG. 10A. In one embodiment, the duty ratio determination circuit 711 includes: a threshold time point generation circuit 910 and a comparison circuit 90. Please refer to FIG. 13A along with FIG. 8A and FIG. 8B. In one embodiment, the threshold time point generation circuit 910 is configured to operably generate the duty ratio threshold signal Sdth31. The comparison circuit 90 is configured to operably generate a first comparison signal DLTth1 according to a comparison between the duty ratio threshold signal Sdth31 and the switch control signal UG31. When the first comparison signal DLTth1 is enabled, it indicates that the duty ratio DH of the upper gate switch SWH is smaller than the duty ratio threshold Dth31.

Figure 13B:
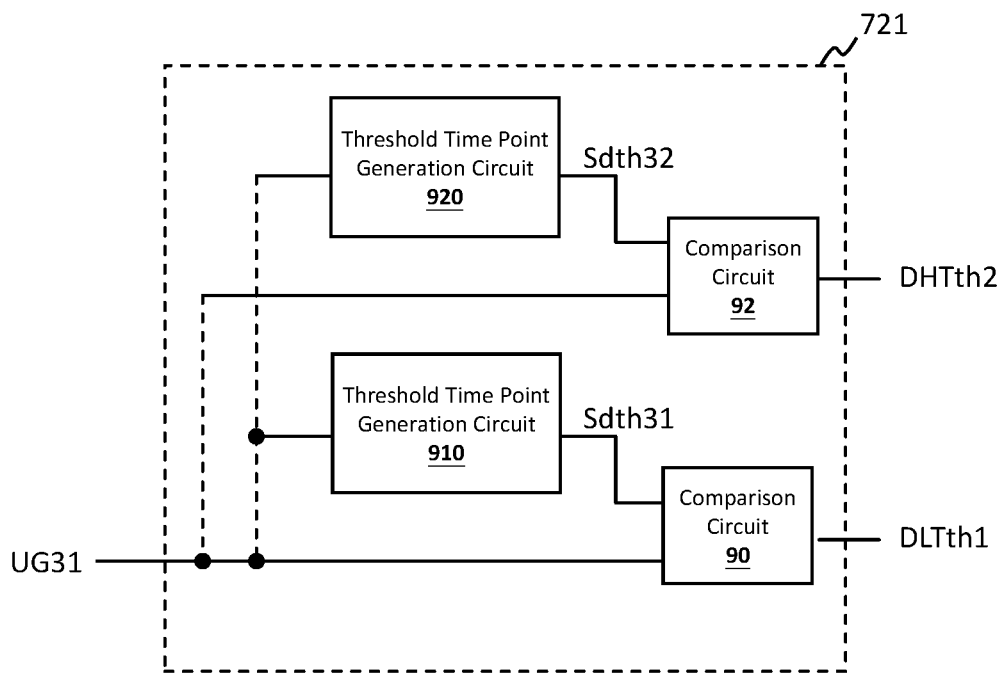

Please refer to FIG. 13B, which shows a schematic block diagram of a duty ratio determination circuit in an inductor current emulator circuit according to another embodiment of the present invention. The duty ratio determination circuit 721 shown in FIG. 13B is a specific embodiment of the duty ratio determination circuit 720 shown in FIG. 10B. The duty ratio determination circuit 721 of this embodiment shown in FIG. 13B is similar to the duty ratio determination circuit 711 of the embodiment shown in FIG. 13A, but is different in that: in addition to the threshold time point generation circuit 910 and the comparison circuit 90, the duty ratio determination circuit 721 of this embodiment shown in FIG. 13B further includes: a threshold time point generation circuit 920 and a comparison circuit 92. Please refer to FIG. 13A along with FIG. 8C to FIG. 8E. In one embodiment, the threshold time point generation circuit 920 is configured to operably generate the duty ratio threshold signal Sdth32. The comparison circuit 92 is configured to operably generate the second comparison signal DLTth2 according to a comparison between the duty ratio threshold signal Sdth32 and a switch control signal UG31. When the second comparison signal DLTth2 is enabled, it indicates that the duty ratio DH of the upper gate switch SWH is greater than the duty ratio threshold Dth32.

Figure 14:
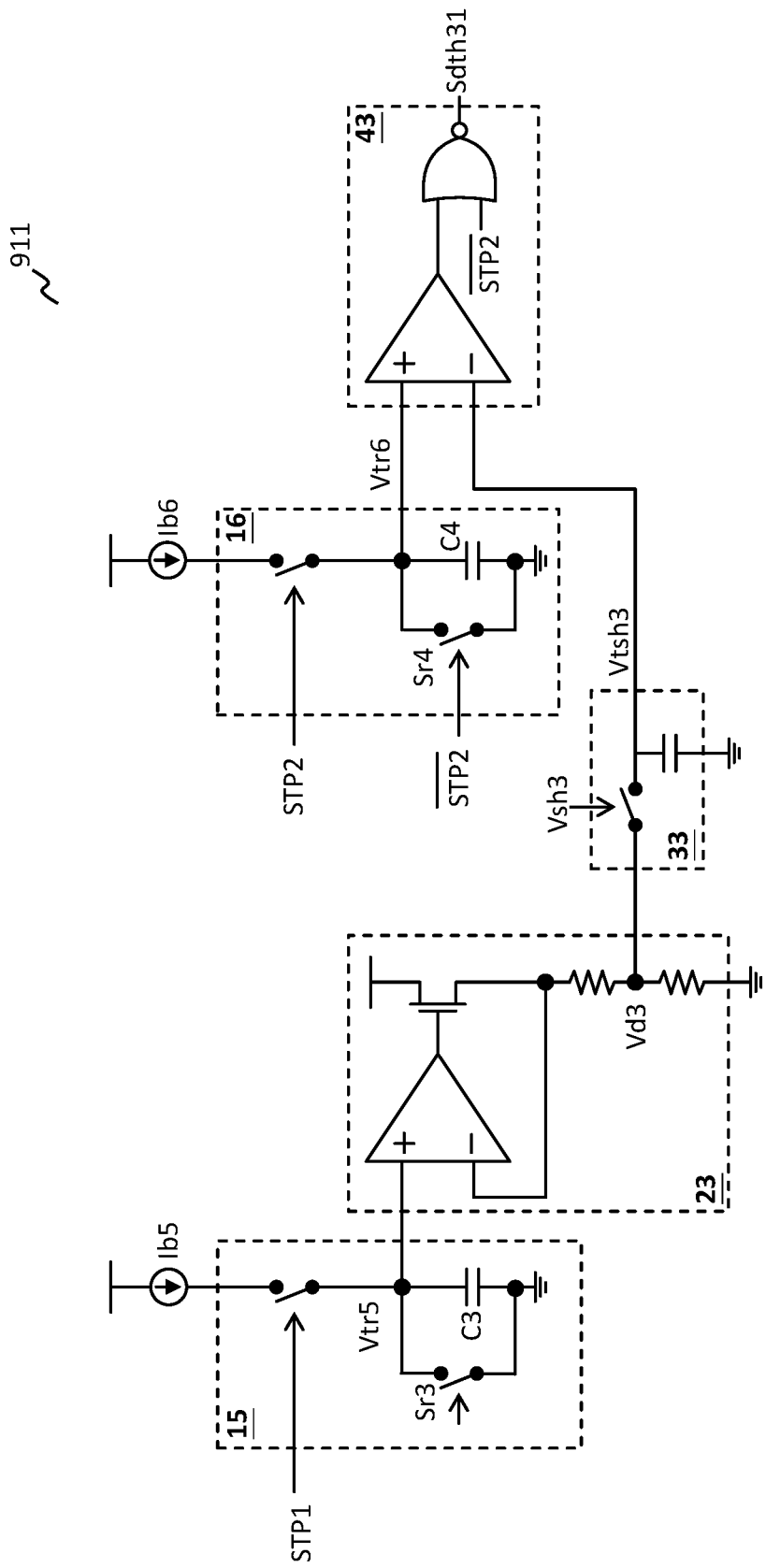
FIG. 14 shows a schematic diagram of a threshold time point generation circuit in an inductor current emulator circuit according to an embodiment of the present invention.

Please refer to FIG. 14, which shows a schematic diagram of a threshold time point generation circuit in an inductor current emulator circuit according to an embodiment of the present invention. The threshold time point generation circuit 911 shown in FIG. 14 is a specific embodiment of the threshold time point generation circuit 910 shown in FIG. 13A and FIG. 13B. The threshold time point generation circuit 920 shown in FIG. 13B also can be configured similarly as the threshold time point generation circuit 911 shown in FIG. 14. Please refer to FIG. 14 along with FIG. 8A. In one embodiment, the threshold time point generation circuit 911 is configured to operably decide the duty ratio threshold Dth31. In one embodiment, the threshold time point generation circuit 911 includes: an integrator 15, a voltage buffer and conversion circuit 23, a timing sample-and-hold circuit 33, an integrator 16 and a comparison circuit 43.

Figure 15:
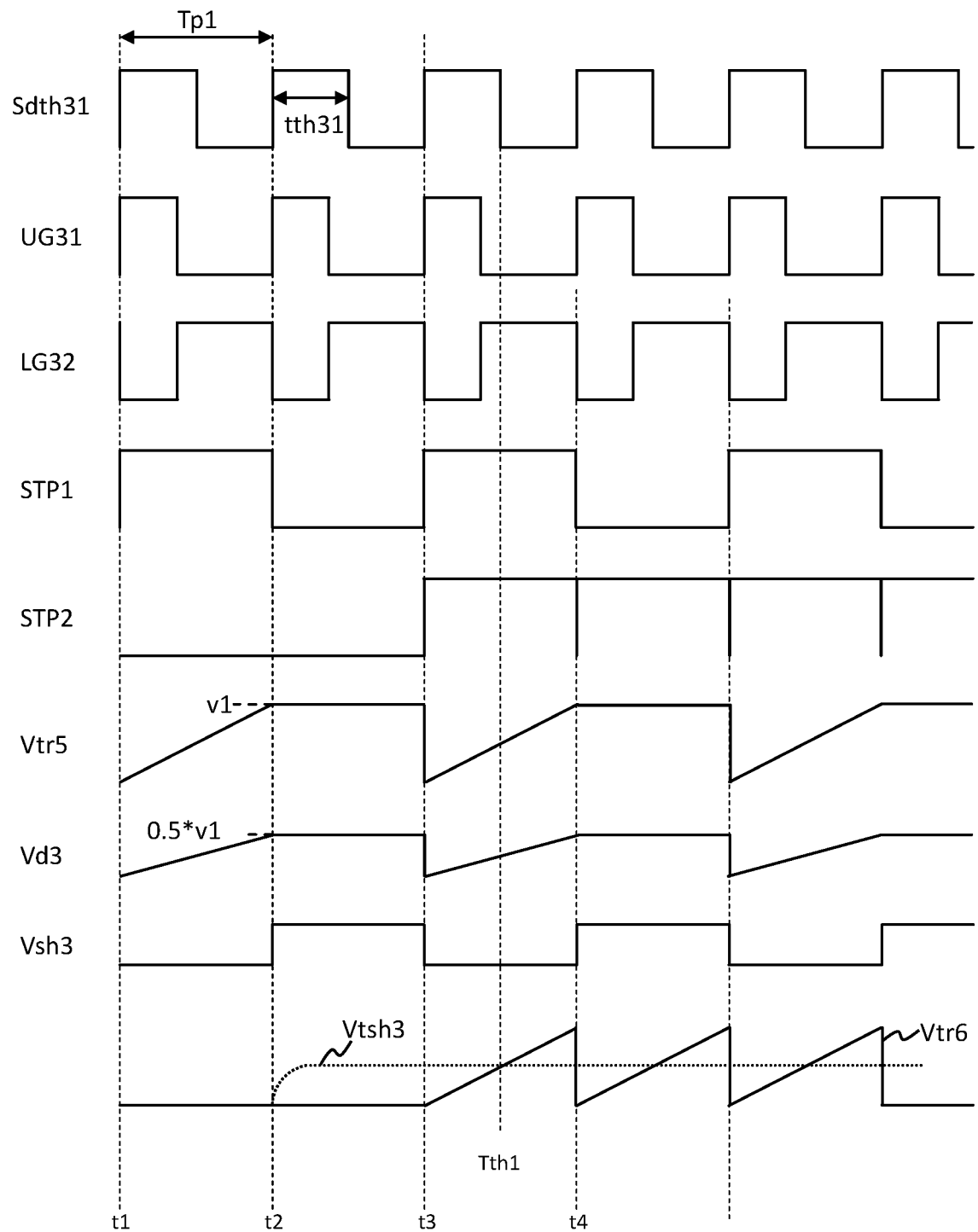
FIG. 15 illustrates a signal waveform diagram depicting the operation of the threshold time point generation circuit of FIG. 14.

Please refer to FIG. 14 in conjunction with FIG. 15. FIG. 15 illustrates a signal waveform diagram depicting the operation of the threshold time point generation circuit of FIG. 14. In one embodiment, the integrator 15 is configured to operably execute an integration operation on a current source Ib5 during an enable period (e.g., from time point t1 to time point t2 in FIG. 15) of the period clock signal STP1, via an integration capacitor C3 and according to a period clock signal STP1, to generate a timing ramp signal Vtr5, wherein the level v1 of the timing ramp signal Vtr5 at an end time point of the enable period of the period clock signal STP1 is proportional to the time length of the enable period of the period clock signal STP1. For example, as shown in the embodiment shown in FIG. 15, the level of the timing ramp signal Vtr5 at the time point t2 is proportional to the time length from the time point t1 to the time point t2. In one embodiment, the period clock signal STP1 is generated according to the switch control signal UG31. That is, the level v1 of the timing ramp signal Vtr5 is proportional to the switching period of the switch control signal UG31, wherein the enable period of the period clock signal STP1 corresponds to the switching period of at least one switch control signal UG31. For example, as shown in the embodiment shown in FIG. 15, one of every two switching periods of the switch control signal UG31 corresponds to one enable period of the period clock signal STP1. In one embodiment, the integrator 15 includes a reset switch Sr3, which is configured to operably discharge and reset the integration capacitor C3 during a period in which the timing ramp signal Vtr5 is at low level, as shown in FIG. 15.

In one embodiment, the voltage buffer and conversion circuit 23 is configured to operably buffer and convert the timing ramp signal Vtr5, to generate a divided-voltage signal Vd3, wherein the divided-voltage signal Vd3 has a third voltage division ratio to the timing ramp signal Vtr5, wherein the third voltage division ratio corresponds to the duty ratio threshold Dth31. In this embodiment, the high level of the timing ramp signal Vtr5 is for example equal to v1 and the high level of the divided-voltage signal Vd3 is for example equal to 0.5*v1; thus, the third voltage division ratio is equal to 0.5. In one embodiment, the timing sample-and-hold circuit 33 is configured to operably sample-and-hold a level (which is equal to 0.5*v1) of the divided-voltage signal Vd3 according to a control signal Vsh3 at the end time point (e.g., the time point t2) of the enable period of the period clock signal STP1, to generate a timing sample-and-hold signal Vtsh3 (as indicated by a dotted line in the nineth signal waveform shown in FIG. 15).

In one embodiment, the integrator 16 is configured to operably execute an integration operation on a current source Ib6 during an enable period (e.g., from time point t3 to time point t4 in FIG. 15) of the period clock signal STP2, via an integration capacitor C4 and according to a period clock signal STP2, to generate a timing ramp signal Vtr6 (as indicated by a solid line in the nineth signal waveform shown in FIG. 15). In one embodiment, the period clock signal STP2 is generated according to the switch control signal UG31. The enable period of the period clock signal STP2 corresponds to the switching period of at least one switch control signal UG31 and is subsequent to the enable period of the period clock signal STP1. For example, as shown in the embodiment shown in FIG. 15, the time point t3 at which the period clock signal STP2 starts being enabled is subsequent to the time point t1 at which the period clock signal STP1 starts being enabled. And, subsequent to the time point t3, each enable period of the period clock signal STP2 corresponds to one switching period of the switch control signal UG31. In one embodiment, the integrator 16 includes a reset switch Sr4, which is configured to operably discharge and reset the integration capacitor C4 during a disable period of the period clock signal STP2.

In one embodiment, the comparison circuit 43 is configured to operably generate the duty ratio threshold signal Sdth31 according to the timing sample-and-hold signal Vtsh3 and the timing ramp signal Vtr6, wherein the duty ratio threshold signal Sdth31 indicates a time point at which the timing sample-and-hold signal Vtsh3 is equal to the timing ramp signal Vtr6, wherein the time point at which the timing sample-and-hold signal Vtsh3 is equal to the timing ramp signal Vtr6 indicates a time point (e.g., time point Tth1) in the switching period that corresponds to the duty ratio threshold Dth31. To elaborate in more detail, the ratio of the interval from the time point t3 (i.e., a start time point of the enable period of the period clock signal STP2) to the time point Tth1 to the switching period Tp1 is the duty ratio threshold Dth31. In one embodiment, the third voltage division ratio, a level of the current source Ib5, a capacitance of the integration capacitor C3 in the integrator 15, a level of the current source Ib6 and a capacitance of the integration capacitor C4 in the integrator 16 decide the time length that the timing ramp signal Vtr6 takes to reach the timing sample-and-hold signal Vtsh3.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. An inductor current emulator circuit for use in a switching power regulator, wherein the switching power regulator is configured to operably control a first switch and a second switch of a power stage circuit in the switching power regulator, to switch an inductor, thus converting an input voltage to an output voltage, wherein the inductor current emulator circuit is configured to operably generate a current emulation signal for emulating an inductor current flowing through the inductor, wherein the first switch is controlled by a first switch control signal and the first switch has a first ON-current when the first switch is ON during a first ON-time, and wherein the second switch is controlled by a second switch control signal and the second switch has a second ON-current when the second switch is ON during a second ON-time; the inductor current emulator circuit comprising:
   a first sensing circuit, which is configured to operably sense the second ON-current of the second switch, to generate a first current sensing signal; and
   an emulation control circuit, which is configured to operably generate a first part of the current emulation signal according to the first current sensing signal during the second ON-time in a case when a first duty ratio of the first switch is smaller than a first duty ratio threshold, and the emulation control circuit is configured to operably sample-and-hold the first current sensing signal to generate a first sample-and-hold signal at an intermediate time point within the second ON-time, and the emulation control circuit is configured to operably generate a second part of the current emulation signal according to the first sample-and-hold signal during a following first ON-time.

2. The inductor current emulator circuit of claim 1, further comprising:
a second sensing circuit, which is configured to operably sense the first ON-current of the first switch, to generate a second current sensing signal;
wherein the emulation control circuit is further configured to operably generate the second part of the current emulation signal according to the second current sensing signal during the first ON-time in a case when the first duty ratio of the first switch is greater than a second duty ratio threshold, and the emulation control circuit is further configured to operably sample-and-hold the second current sensing signal to generate a second sample-and-hold signal at an intermediate time point within the first ON-time, and the emulation control circuit is further configured to operably generate the first part of the current emulation signal according to the second sample-and-hold signal during a following second ON-time.

3. The inductor current emulator circuit of claim 1, wherein the first switch and the second switch are configured as one of following:
the first switch is configured as an upper gate switch of the power stage circuit, whereas, the second switch is configured as a lower gate switch of the power stage circuit; or
the first switch is configured as a lower gate switch of the power stage circuit, whereas, the second switch is configured as an upper gate switch of the power stage circuit.

4. The inductor current emulator circuit of claim 2, wherein the second duty ratio threshold is greater than or equal to the first duty ratio threshold.

5. The inductor current emulator circuit of claim 4, wherein the first duty ratio threshold is equal to 50%.

6. The inductor current emulator circuit of claim 2, wherein when the first duty ratio is greater than the first duty ratio threshold and smaller than the second duty ratio threshold, the emulation control circuit is configured to operably generate the second part of the current emulation signal according to the second current sensing signal during the first ON-time, and the emulation control circuit is configured to operably generate the first part of the current emulation signal according to the first current sensing signal during the second ON-time.

7. The inductor current emulator circuit of claim 2, wherein the switching power regulator includes: a plurality of the power stage circuits and a corresponding plurality of the inductor current emulator circuits, wherein a current balancing operation and a phase shedding operation of the power stage circuits are determined according to a corresponding plurality of the current emulation signals generated by the inductor current emulator circuits.

8. The inductor current emulator circuit of claim 1, further comprising:
a second sensing circuit, which is configured to operably sense the first ON-current of the first switch, to generate a second current sensing signal;
wherein in a case when the first duty ratio is greater than the first duty ratio threshold, the emulation control circuit is configured to operably generate the second part of the current emulation signal according to the second current sensing signal during the first ON-time, and the emulation control circuit is configured to operably generate the first part of the current emulation signal according to the first current sensing signal during a following second ON-time.

9. The inductor current emulator circuit of claim 2, wherein the emulation control circuit includes:
a first intermediate time point generation circuit, which is configured to operably indicate the intermediate time point within the second ON-time;
wherein the first intermediate time point generation circuit includes:
a first integrator, which is configured to operably execute an integration operation on a first current source according to a first clock signal and the second switch control signal during an enable period of the first clock signal, to generate a first timing ramp signal, wherein a level of the first timing ramp signal at an end time point of the enable period of the first clock signal is proportional to a time length of the enable period of the first clock signal, wherein the enable period of the first clock signal corresponds to at least one second ON-time;
a first voltage buffer and conversion circuit, which is configured to operably buffer and convert the first timing ramp signal, to generate a first divided-voltage signal, wherein the first divided-voltage signal has a first voltage division ratio to the first timing ramp signal;
a first timing sample-and-hold circuit, which is configured to operably sample-and-hold a level of the first divided-voltage signal at the end time point of the enable period of the first clock signal, to generate a first timing sample-and-hold signal;
a second integrator, which is configured to operably execute an integration operation on a second current source according to a second clock signal and the second switch control signal during an enable period of the second clock signal, to generate a second timing ramp signal, wherein the enable period of the second clock signal corresponds to the at least one second ON-time, and the enable period of the second clock signal is subsequent to the enable period of the first clock signal; and
a first comparison circuit, which is configured to operably generate a first sample-and-hold control signal according to the first timing sample-and-hold signal and the second timing ramp signal, wherein a time point at which the first timing sample-and-hold signal is equal to the second timing ramp signal corresponds to the intermediate time point within the second ON-time;
wherein the first voltage division ratio, a level of the first current source and a level of the second current source decide a time length that the second timing ramp signal takes to reach the first timing sample-and-hold signal.

10. The inductor current emulator circuit of claim 2, wherein the emulation control circuit includes:
a second intermediate time point generation circuit, which is configured to operably indicate the intermediate time point within the first ON-time;
wherein the second intermediate time point generation circuit includes:
a third integrator, which is configured to operably execute an integration operation on a third current source according to a third clock signal and the first switch control signal during an enable period of the third clock signal, to generate a third timing ramp signal, wherein a level of the third timing ramp signal at an end time point of the enable period of the third clock signal is proportional to a time length of the enable period of the third clock signal, wherein the enable period of the third clock signal corresponds to at least one first ON-time;
a second voltage buffer and conversion circuit, which is configured to operably buffer and convert the third timing ramp signal, to generate a second divided-voltage signal, wherein the second divided-voltage signal has a second voltage division ratio to the third timing ramp signal;
a second timing sample-and-hold circuit, which is configured to operably sample-and-hold a level of the second divided-voltage signal at the end time point of the enable period of the third clock signal, to generate a second timing sample-and-hold signal;
a fourth integrator, which is configured to operably execute an integration operation on a fourth current source according to a fourth clock signal and the first switch control signal during an enable period of the fourth clock signal, to generate a fourth timing ramp signal, wherein the enable period of the fourth clock signal corresponds to the at least one first ON-time, and the enable period of the fourth clock signal is subsequent to the enable period of the third clock signal; and
a second comparison circuit, which is configured to operably generate a second sample-and-hold control signal according to the second timing sample-and-hold signal and the fourth timing ramp signal, wherein a time point at which the second timing sample-and-hold signal is equal to the fourth timing ramp signal corresponds to the intermediate time point within the first ON-time;
wherein the second voltage division ratio, a level of the third current source and a level of the fourth current source decide a time length that the fourth timing ramp signal takes to reach the second timing sample-and-hold signal.

11. The inductor current emulator circuit of claim 1, wherein the emulation control circuit includes:
a first duty ratio determination circuit, which is configured to operably generate a first enable signal according to a comparison between a first duty ratio threshold signal and the first switch control signal, wherein the first enable signal indicates whether the first duty ratio is smaller than the first duty ratio threshold, wherein a period of the first duty ratio threshold signal is equal to a switching period of the first switch control signal, and wherein a duty ratio of the first duty ratio threshold signal when the first duty ratio threshold signal is enabled is equal to the first duty ratio threshold.

12. The inductor current emulator circuit of claim 2, wherein the emulation control circuit includes:
a second duty ratio determination circuit, which is configured to operably generate a second enable signal according to a comparison between a second duty ratio threshold signal and the second switch control signal, wherein the second enable signal indicates whether the first duty ratio is greater than the second duty ratio threshold, wherein a period of the second duty ratio threshold signal is equal to a switching period of the second switch control signal, and wherein a duty ratio of the second duty ratio threshold signal when the second duty ratio threshold signal is enabled is equal to the second duty ratio threshold.

13. The inductor current emulator circuit of claim 11, wherein the first duty ratio determination circuit includes:
a first threshold time point generation circuit, which is configured to operably decide the first duty ratio threshold;
wherein the first threshold time point generation circuit includes:
a fifth integrator, which is configured to operably execute an integration operation on a fifth current source according to a first period clock signal and the first switch control signal during an enable period of the first period clock signal, to generate a fifth timing ramp signal, wherein a level of the fifth timing ramp signal at an end time point of the enable period of the first period clock signal is proportional to a time length of the enable period of the first period clock signal, wherein the enable period of the first period clock signal corresponds to the switching period of at least one the first switch control signal;
a third voltage buffer and conversion circuit, which is configured to operably buffer and convert the fifth timing ramp signal, to generate a third divided-voltage signal, wherein the third divided-voltage signal has a third voltage division ratio to the fifth timing ramp signal;
a third timing sample-and-hold circuit, which is configured to operably sample-and-hold a level of the third divided-voltage signal at the end time point of the enable period of the first period clock signal, to generate a third timing sample-and-hold signal;
a sixth integrator, which is configured to operably execute an integration operation on a sixth current source according to a second period clock signal and the first switch control signal during an enable period of the second period clock signal, to generate a sixth timing ramp signal, wherein the enable period of the second period clock signal corresponds to the switching period of at least one the first switch control signal and the enable period of the second period clock signal is subsequent to the enable period of the first period clock signal; and
a third comparison circuit, which is configured to operably generate a third sample-and-hold control signal according to the third timing sample-and-hold signal and the sixth timing ramp signal, wherein a time point at which the third timing sample-and-hold signal is equal to the sixth timing ramp signal indicates a time point within the switching period which corresponds to the first duty ratio threshold;
wherein the third voltage division ratio, a level of the fifth current source and a level of the sixth current source decide a time length that the sixth timing ramp signal takes to reach the third timing sample-and-hold signal.

14. An emulation control circuit for use in an inductor current emulator circuit, wherein the inductor current emulator circuit is for use in a switching power regulator, wherein the switching power regulator is configured to operably control a first switch and a second switch of a power stage circuit in the switching power regulator, to switch an inductor, thus converting an input voltage to an output voltage, wherein the inductor current emulator circuit is configured to operably generate a current emulation signal for emulating an inductor current flowing through the inductor, wherein the first switch is controlled by a first switch control signal and the first switch has a first ON-current when the first switch is ON during a first ON-time, and wherein the second switch is controlled by a second switch control signal and the second switch has a second ON-current when the second switch is ON during a second ON-time, wherein the inductor current emulator circuit includes: a first sensing circuit, which is configured to operably sense the second ON-current of the second switch, to generate a first current sensing signal;

wherein the emulation control circuit is configured to operably generate a first part of the current emulation signal according to the first current sensing signal during the second ON-time in a case when a first duty ratio of the first switch is smaller than a first duty ratio threshold, and the emulation control circuit is configured to operably sample-and-hold the first current sensing signal to generate a first sample-and-hold signal at an intermediate time point within the second ON-time, and the emulation control circuit is configured to operably generate a second part of the current emulation signal according to the first sample-and-hold signal during a following first ON-time.

15. The emulation control circuit of claim 14, wherein the inductor current emulator circuit further includes: a second sensing circuit, which is configured to operably sense the first ON-current of the first switch, to generate a second current sensing signal;

wherein the emulation control circuit is further configured to operably generate the second part of the current emulation signal according to the second current sensing signal during the first ON-time in a case when the first duty ratio of the first switch is greater than a second duty ratio threshold, and the emulation control circuit is further configured to operably sample-and-hold the second current sensing signal to generate a second sample-and-hold signal at an intermediate time point within the first ON-time, and the emulation control circuit is further configured to operably generate the first part of the current emulation signal according to the second sample-and-hold signal during a following second ON-time.

16. The emulation control circuit of claim 15, wherein the second duty ratio threshold is greater than or equal to the first duty ratio threshold.

17. The emulation control circuit of claim 15, wherein when the first duty ratio is greater than the first duty ratio threshold and smaller than the second duty ratio threshold, the emulation control circuit is configured to operably generate the second part of the current emulation signal according to the second current sensing signal during the first ON-time, and the emulation control circuit is configured to operably generate the first part of the current emulation signal according to the first current sensing signal during the second ON-time.

18. The emulation control circuit of claim 14, wherein the inductor current emulator circuit further includes: a second sensing circuit, which is configured to operably sense the first ON-current of the first switch, to generate a second current sensing signal;

wherein in a case when the first duty ratio is greater than the first duty ratio threshold, the emulation control circuit is configured to operably generate the second part of the current emulation signal according to the second current sensing signal during the first ON-time, and the emulation control circuit is configured to operably generate the first part of the current emulation signal according to the first current sensing signal during the following second ON-time.

19. The emulation control circuit of claim 14, further comprising: a first intermediate time point generation circuit, which is configured to operably indicate the intermediate time point within the second ON-time;

wherein the first intermediate time point generation circuit includes:

a first integrator, which is configured to operably execute an integration operation on a first current source according to a first clock signal and the second switch control signal during an enable period of the first clock signal, to generate a first timing ramp signal, wherein a level of the first timing ramp signal at an end time point of the enable period of the first clock signal is proportional to a time length of the enable period of the first clock signal, wherein the enable period of the first clock signal corresponds to at least one second ON-time;

a first voltage buffer and conversion circuit, which is configured to operably buffer and convert the first timing ramp signal, to generate a first divided-voltage signal, wherein the first divided-voltage signal has a first voltage division ratio to the first timing ramp signal;

a first timing sample-and-hold circuit, which is configured to operably sample-and-hold a level of the first divided-voltage signal at the end time point of the enable period of the first clock signal, to generate a first timing sample-and-hold signal;

a second integrator, which is configured to operably execute an integration operation on a second current source according to a second clock signal and the second switch control signal during an enable period of the second clock signal, to generate a second timing ramp signal, wherein the enable period of the second clock signal corresponds to the at least one second ON-time, and the enable period of the second clock signal is subsequent to the enable period of the first clock signal; and a first comparison circuit, which is configured to operably generate a first sample-and-hold control signal according to the first timing sample-and-hold signal and the second timing ramp signal, wherein a time point at which the first timing sample-and-hold signal is equal to the second timing ramp signal corresponds to the intermediate time point within the second ON-time;

wherein the first voltage division ratio, a level of the first current source and a level of the second current source decide a time length that the second timing ramp signal takes to reach the first timing sample-and-hold signal.

20. The emulation control circuit of claim 15, further comprising: a second intermediate time point generation circuit, which is configured to operably indicate the intermediate time point within the first ON-time;

wherein the second intermediate time point generation circuit includes:

a third integrator, which is configured to operably execute an integration operation on a third current source according to a third clock signal and the first switch control signal during an enable period of the third clock signal, to generate a third timing ramp signal, wherein a level of the third timing ramp signal at an end time point of the enable period of the third clock signal is proportional to a time length of the enable period of the third clock signal, wherein the enable period of the third clock signal corresponds to at least one first ON-time;

a second voltage buffer and conversion circuit, which is configured to operably buffer and convert the third timing ramp signal, to generate a second divided-voltage signal, wherein the second divided-voltage signal has a second voltage division ratio to the third timing ramp signal;

a second timing sample-and-hold circuit, which is configured to operably sample-and-hold a level of the second divided-voltage signal at the end time point of the enable period of the third clock signal, to generate a second timing sample-and-hold signal;

a fourth integrator, which is configured to operably execute an integration operation on a fourth current source according to a fourth clock signal and the first switch control signal during an enable period of the fourth clock signal, to generate a fourth timing ramp signal, wherein the enable period of the fourth clock signal corresponds to the at least one first ON-time, and the enable period of the fourth clock signal is subsequent to the enable period of the third clock signal; and a second comparison circuit, which is configured to operably generate a second sample-and-hold control signal according to the second timing sample-and-hold signal and the fourth timing ramp signal, wherein a time point at which the second timing sample-and-hold signal is equal to the fourth timing ramp signal corresponds to the intermediate time point within the first ON-time;

wherein the second voltage division ratio, a level of the third current source and a level of the fourth current source decide a time length that the fourth timing ramp signal takes to reach the second timing sample-and-hold signal.

21. The emulation control circuit of claim 14, further comprising:

a first duty ratio determination circuit, which is configured to operably generate a first enable signal according to a comparison between a first duty ratio threshold signal and the first switch control signal, wherein the first enable signal indicates whether the first duty ratio is smaller than the first duty ratio threshold, wherein a period of the first duty ratio threshold signal is equal to a switching period of the first switch control signal, and wherein a duty ratio of the first duty ratio threshold signal when the first duty ratio threshold signal is enabled is equal to the first duty ratio threshold.

22. The emulation control circuit of claim 15, further comprising:

a second duty ratio determination circuit, which is configured to operably generate a second enable signal according to a comparison between a second duty ratio threshold signal and the second switch control signal, wherein the second enable signal indicates whether the first duty ratio is greater than the second duty ratio threshold, wherein a period of the second duty ratio threshold signal is equal to a switching period of the second switch control signal, and wherein a duty ratio of the second duty ratio threshold signal when the second duty ratio threshold signal is enabled is equal to the second duty ratio threshold.

23. The emulation control circuit of claim 21, wherein the first duty ratio determination circuit includes:

a first threshold time point generation circuit, which is configured to operably decide the first duty ratio threshold;

wherein the first threshold time point generation circuit includes:

a fifth integrator, which is configured to operably execute an integration operation on a fifth current source according to a first period clock signal and the first switch control signal during an enable period of the first period clock signal, to generate a fifth timing ramp signal, wherein a level of the fifth timing ramp signal at an end time point of the enable period of the first period clock signal is proportional to a time length of the enable period of the first period clock signal, wherein the enable period of the first period clock signal corresponds to the switching period of at least one the first switch control signal;

a third voltage buffer and conversion circuit, which is configured to operably buffer and convert the fifth timing ramp signal, to generate a third divided-voltage signal, wherein the third divided-voltage signal has a third voltage division ratio to the fifth timing ramp signal;

a third timing sample-and-hold circuit, which is configured to operably sample-and-hold a level of the third divided-voltage signal at the end time point of the enable period of the first period clock signal, to generate a third timing sample-and-hold signal;

a sixth integrator, which is configured to operably execute an integration operation on a sixth current source according to a second period clock signal and the first switch control signal during an enable period of the second period clock signal, to generate a sixth timing ramp signal, wherein the enable period of the second period clock signal corresponds to the switching period of at least one the first switch control signal and the enable period of the second period clock signal is subsequent to the enable period of the first period clock signal; and a third comparison circuit, which is configured to operably generate a third sample-and-hold control signal according to the third timing sample-and-hold signal and the sixth timing ramp signal, wherein a time point at which the third timing sample-and-hold signal is equal to the sixth timing ramp signal indicates a time point within the switching period which corresponds to the first duty ratio threshold;

wherein the third voltage division ratio, a level of the fifth current source and a level of the sixth current source decide a time length that the sixth timing ramp signal takes to reach the third timing sample-and-hold signal.

24. An emulation control method configured to operably control an inductor current emulator circuit, wherein the inductor current emulator circuit is for use in a switching power regulator, wherein the switching power regulator is configured to operably control a first switch and a second switch of a power stage circuit in the switching power regulator, to switch an inductor, thus converting an input voltage to an output voltage, wherein the inductor current emulator circuit is configured to operably generate a current emulation signal for emulating an inductor current flowing through the inductor, wherein the first switch is controlled by a first switch control signal and the first switch has a first ON-current when the first switch is ON during a first ON-time, wherein second switch is controlled by a second switch control signal and the second switch has a second ON-current when the second switch is ON during a second ON-time, wherein the inductor current emulator circuit includes: a first sensing circuit, which is configured to operably sense the second ON-current of the second switch, to generate a first current sensing signal; the emulation control method comprising following steps:

generating a first part of the current emulation signal according to the first current sensing signal during the second ON-time in a case when a first duty ratio of the first switch is smaller than a first duty ratio threshold; and sampling-and-holding the first current sensing signal to generate a first sample-and-hold signal at an intermediate time point within the second ON-time; and generating a second part of the current emulation signal according to the first sample-and-hold signal during a following first ON-time.

25. The emulation control method of claim 24, wherein the inductor current emulator circuit further includes: a second sensing circuit, which is configured to operably sense the first ON-current of the first switch, to generate a second current sensing signal;

wherein the emulation control method further comprising following steps:

generating the second part of the current emulation signal according to the second current sensing signal during the first ON-time in a case when the first duty ratio of the first switch is greater than a second duty ratio threshold; and sampling-and-holding the second current sensing signal to generate a second sample-and-hold signal at an intermediate time point within the first ON-time; and generating the first part of the current emulation signal according to the second sample-and-hold signal during a following second ON-time.

26. The emulation control method of claim 25, wherein the second duty ratio threshold is greater than or equal to the first duty ratio threshold.

27. The emulation control method of claim 25, further comprising following steps:

when the first duty ratio is greater than the first duty ratio threshold and smaller than the second duty ratio threshold, generating the second part of the current emulation signal according to the second current sensing signal during the first ON-time; and when the first duty ratio is greater than the first duty ratio threshold and smaller than the second duty ratio threshold, generating the first part of the current emulation signal according to the first current sensing signal during the second ON-time.

28. The emulation control method of claim 24, wherein the inductor current emulator circuit further includes: a second sensing circuit, which is configured to operably sense the first ON-current of the first switch, to generate a second current sensing signal;

wherein the emulation control method further comprising following steps:

in a case when the first duty ratio is greater than the first duty ratio threshold, generating the second part of the current emulation signal according to the second current sensing signal during the first ON-time; and generating the first part of the current emulation signal according to the first current sensing signal during the following second ON-time.

29. The emulation control method of claim 24, further comprising following steps:

executing an integration operation on a first current source according to a first clock signal and the second switch control signal during an enable period of the first clock signal, to generate a first timing ramp signal, wherein a level of the first timing ramp signal at an end time point of the enable period of the first clock signal is proportional to a time length of the enable period of the first clock signal, wherein the enable period of the first clock signal corresponds to at least one second ON-time;

buffering and converting the first timing ramp signal, to generate a first divided-voltage signal, wherein the first divided-voltage signal has a first voltage division ratio to the first timing ramp signal;

sampling-and-holding a level of the first divided-voltage signal at the end time point of the enable period of the first clock signal, to generate a first timing sample-and-hold signal;

executing an integration operation on a second current source according to a second clock signal and the second switch control signal, to generate a second timing ramp signal during an enable period of the second clock signal, wherein the enable period of the second clock signal corresponds to the at least one second ON-time, and the enable period of the second clock signal is subsequent to the enable period of the first clock signal; and generating a first sample-and-hold control signal according to the first timing sample-and-hold signal and the second timing ramp signal, wherein a time point at which the first timing sample-and-hold signal is equal to the second timing ramp signal corresponds to the intermediate time point within the second ON-time;

wherein the first voltage division ratio, a level of the first current source and a level of the second current source decide a time length that the second timing ramp signal takes to reach the first timing sample-and-hold signal.

30. The emulation control method of claim 24, further comprising following steps:

generating a first enable signal according to a comparison between a first duty ratio threshold signal and the first switch control signal, wherein the first enable signal indicates whether the first duty ratio is smaller than the first duty ratio threshold, wherein a period of the first duty ratio threshold signal is equal to a switching period of the first switch control signal, and wherein a duty ratio of the first duty ratio threshold signal when the first duty ratio threshold signal is enabled is equal to the first duty ratio threshold.

* * * * *